(12) United States Patent
Guan et al.

(10) Patent No.: US 12,542,318 B2
(45) Date of Patent: Feb. 3, 2026

(54) BATTERY DEVICE

(71) Applicant: CALB Co., Ltd., Jiangsu (CN)

(72) Inventors: Junshan Guan, Changzhou (CN);
Yongjie Zhang, Changzhou (CN);
Liangjie Gu, Changzhou (CN); Jiuling Xu, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 661 days.

(21) Appl. No.: 17/974,543

(22) Filed: Oct. 27, 2022

(65) Prior Publication Data

US 2024/0039089 A1   Feb. 1, 2024

(30) Foreign Application Priority Data

Jul. 26, 2022 (CN) .......................... 202210887651.1

(51) Int. Cl.
*H01M 50/14* (2021.01)
*H01M 10/653* (2014.01)
(Continued)

(52) U.S. Cl.
CPC ....... *H01M 50/14* (2021.01); *H01M 10/6554* (2015.04); *H01M 50/204* (2021.01); *H01M 50/262* (2021.01); *H01M 10/653* (2015.04)

(58) Field of Classification Search
CPC ............. H01M 50/14; H01M 10/6554; H01M 50/204; H01M 50/262; H01M 10/653;
(Continued)

(56) References Cited

U.S. PATENT DOCUMENTS 10,686,170 B2    6/2020    Kritzer et al.
2007/0207377 A1  9/2007    Han et al.
(Continued)

FOREIGN PATENT DOCUMENTS

CN    104319362    *  1/2015
CN    106159381       8/2019
(Continued)

OTHER PUBLICATIONS

"Search Report of Europe Counterpart Application", issued on Oct. 27, 2023, p. 1-p. 10.
(Continued)

*Primary Examiner* — Lisa S Park
(74) *Attorney, Agent, or Firm* — JCIP GLOBAL INC.

(57) ABSTRACT

A battery device includes batteries arranged in a first direction. Each battery includes a top surface, a bottom surface, two first side surfaces, and two second side surfaces. The first side surfaces are perpendicular to and spaced apart in the first direction. The second side surfaces are parallel to the first direction and spaced apart in a second direction perpendicular to the first direction. Each battery has a flange structure arranged along at least one of the top surface, the bottom surface, and the second side surfaces. The battery device further includes brackets in contact with at least one of the top surface, the bottom surface, and the second side surfaces. The height of each bracket is greater than or equal to the height of the flange structure. At least a part of each bracket is located between at least a part of the flange structures of adjacent batteries.

41 Claims, 15 Drawing Sheets

(51) Int. Cl.
H01M 10/6554 (2014.01)
H01M 50/204 (2021.01)
H01M 50/262 (2021.01)

(58) Field of Classification Search
CPC ............. H01M 50/102; H01M 50/209; H01M 50/249; H01M 50/258; H01M 50/264; H01M 50/291; H01M 50/293; H01M 50/244; H01M 50/233; Y02E 60/10
See application file for complete search history.

(56) References Cited

U.S. PATENT DOCUMENTS

| | | | |
|---|---|---|---|
| 2012/0040225 A1 | 2/2012 | Raiser | |
| 2013/0052496 A1* | 2/2013 | Han | H01M 50/209 429/96 |

FOREIGN PATENT DOCUMENTS

| | | |
|---|---|---|
| CN | 111129375 | 5/2020 |
| CN | 211789201 | * 10/2020 |
| CN | 114665177 | 6/2022 |
| CN | 217823106 | 11/2022 |

OTHER PUBLICATIONS

"Office Action of China Counterpart Application", issued on Aug. 9, 2025, p. 1-p. 8.

* cited by examiner

BATTERY DEVICE

CROSS-REFERENCE TO RELATED APPLICATION

This application claims the priority benefit of China application serial no. 202210887651.1, filed on Jul. 26, 2022. The entirety of the above-mentioned patent application is hereby incorporated by reference herein and made a part of this specification.

BACKGROUND

Technical Field

The disclosure relates to the technical field of batteries, and in particular to a battery device.

Description of Related Art

The battery of a conventional battery device has a flange structure such as a flange. When the battery is accommodated in the box of the battery device, each surface of the battery is in contact with structures such as an upper cover plate, a bottom plate, and a structural beam, and the structures are specifically in contact with the flange structure of the battery. Due to the smaller width of the flange structure, the contact area with other structures is smaller. When the battery is in contact with a related structure of the battery device via the flange structure, it is easy to produce stress concentration issues, causing poor structural stability and reliability of the battery device.

SUMMARY

The disclosure provides a battery device.

According to an aspect of the disclosure, a battery device is provided. The battery device includes multiple batteries arranged in a first direction. A surfaces of each battery includes a top surface, a bottom surface, two first side surfaces, and two second side surfaces. The two first side surfaces are perpendicular to the first direction and are spaced apart in the first direction. Two second side surfaces are parallel to the first direction and are spaced apart in a second direction. The second direction is perpendicular to the first direction. The battery has a flange structure arranged along at least one of the top surface, the bottom surface, and the two second side surfaces. The battery device further includes brackets. Each bracket is in contact with at least one of the top surface, the bottom surface, and the two second side surfaces of a respective one of the batteries. A height of each bracket is greater than or equal to a height of the flange structure. At least a part of each bracket is located between at least a part of the flange structures of adjacent two of the batteries.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DETAILED DESCRIPTION OF DISCLOSED EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
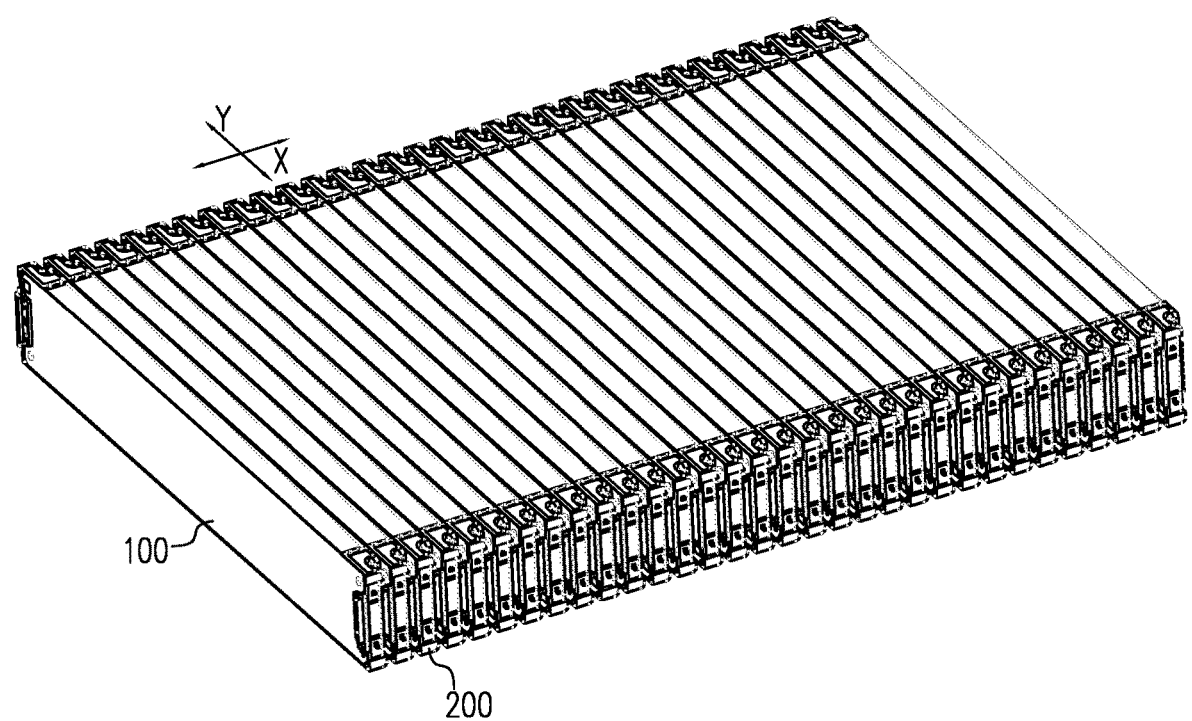
FIG. 1 is a three-dimensional structural schematic view of a partial structure of a battery device according to an exemplary embodiment.

Referring to FIG. 1, which representatively shows a three-dimensional structural schematic view of a partial structure of a battery device provided by the disclosure and specifically shows a three-dimensional structure of a battery pack of the battery device and a bracket 200 disposed on the battery pack. In the exemplary embodiment, the battery device provided by the disclosure is exemplified by being applied to an automotive battery 100. Persons skilled in the art can easily understand that in order to apply the related design of the disclosure to other types of battery devices, various modifications, additions, substitutions, deletions, or other changes can be made to the following specific embodiments. The variations are still within the scope of the principle of the battery device provided by the disclosure.

Figure 2:
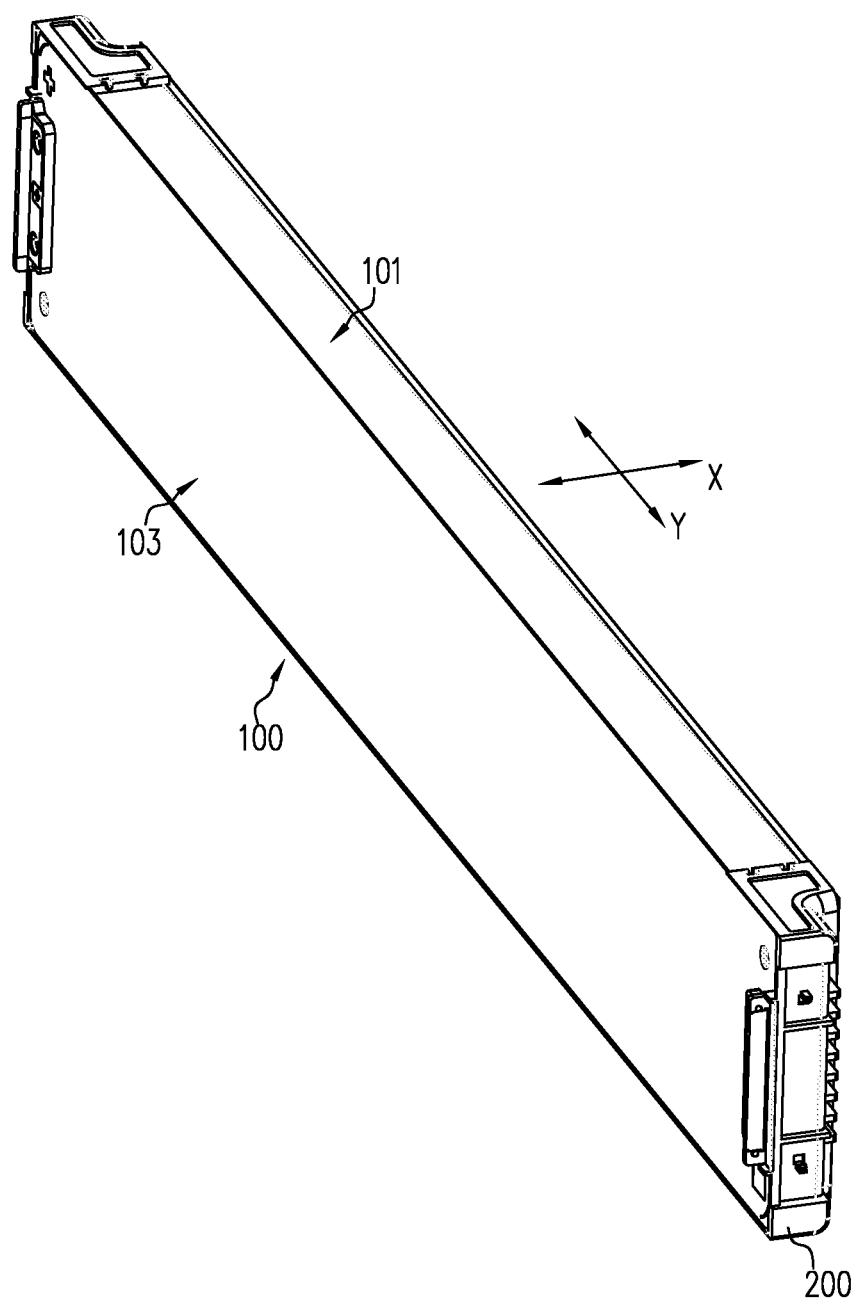
FIG. 2 is a three-dimensional structural schematic view of a partial structure in FIG. 1.
Figure 3:
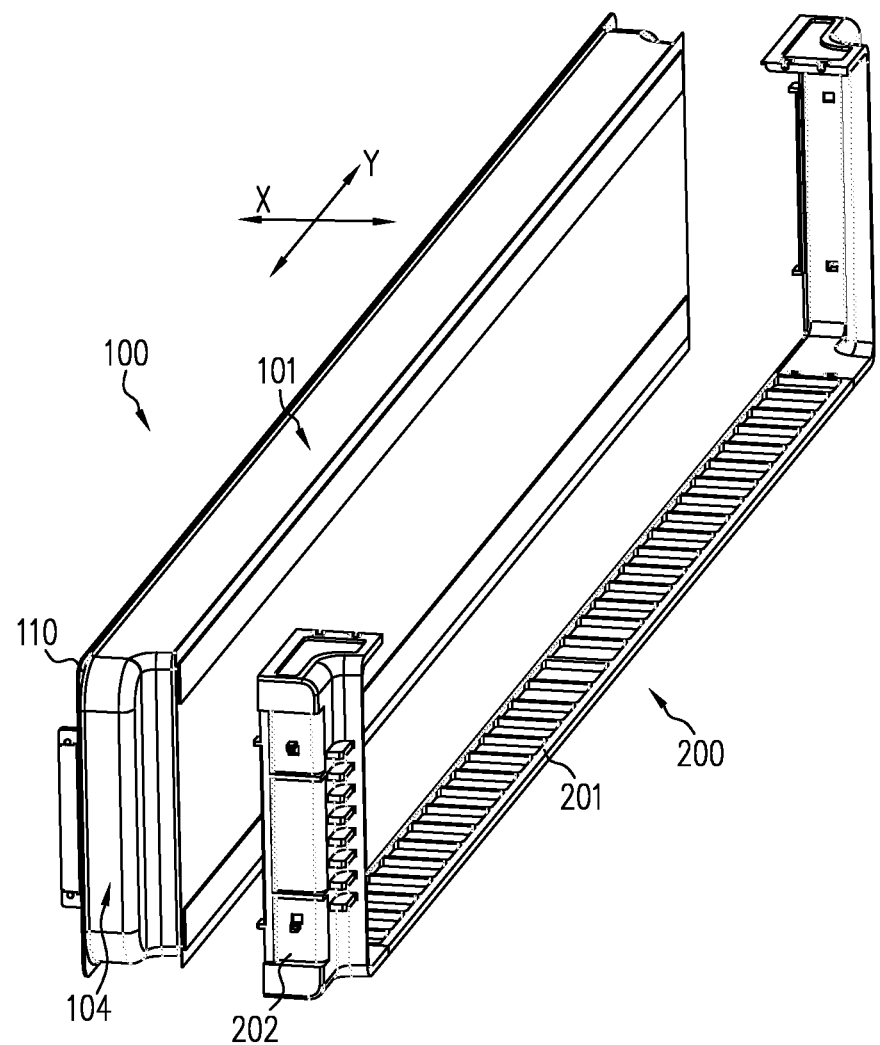
FIG. 3 is an exploded three-dimensional schematic view of FIG. 2.
Figure 4:
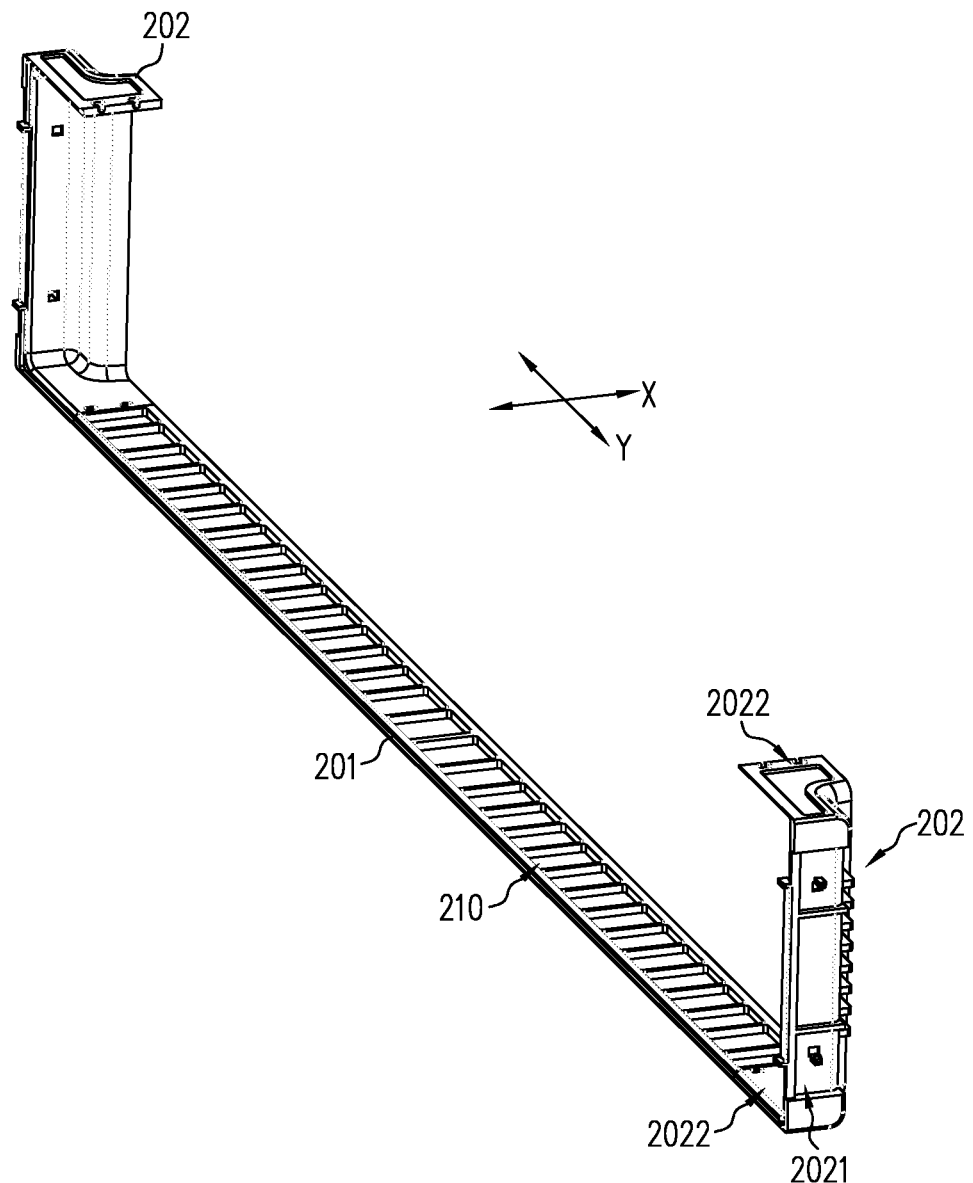
FIG. 4 is a three-dimensional structural schematic view of a bracket shown in FIG. 2.
Figure 5:
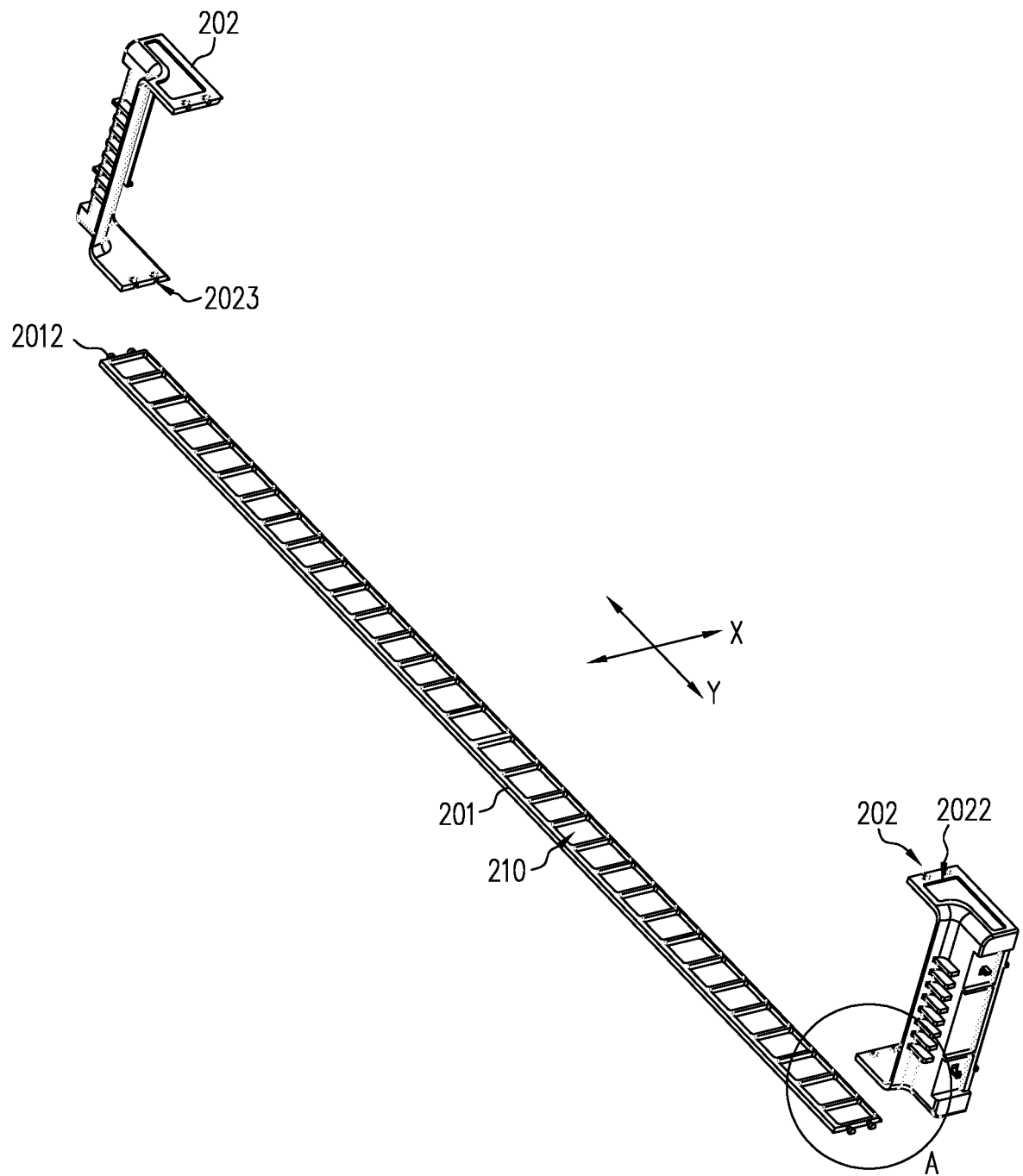
FIG. 5 is an exploded three-dimensional schematic view of the bracket shown in FIG. 4.
Figure 6:
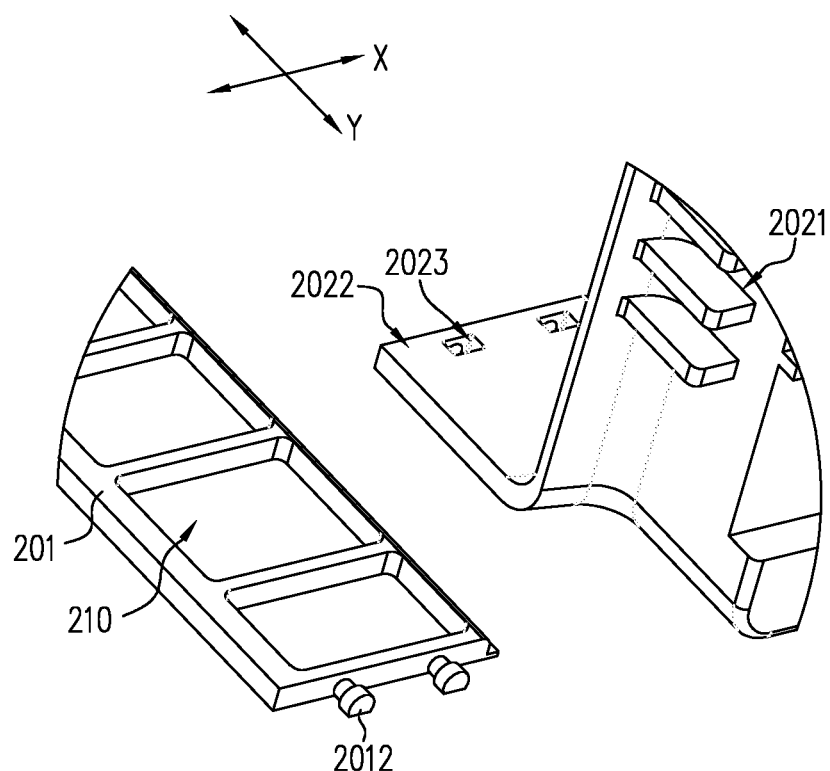
FIG. 6 is an enlarged schematic view of the part A in FIG. 5.

As shown in FIG. 1, in an embodiment of the disclosure, the battery device provided by the disclosure includes a battery pack and a box (not shown). The battery pack is accommodated in the box, and the battery pack includes multiple batteries 100 sequentially arranged. In the following description of the specification, an arrangement direction of the batteries 100 belonging to one battery pack is defined as a first direction X, and the other direction perpendicular to the first direction X is a second direction Y. Referring to FIG. 2 to FIG. 6, FIG. 2 representatively shows a three-dimensional structural schematic view of a partial structure in FIG. 1 and specifically shows a three-dimensional structure of the battery 100 and the bracket 200, FIG. 3 representatively shows an exploded three-dimensional schematic view of FIG. 2, FIG. 4 representatively shows a three-dimensional structural schematic view of the bracket 200, FIG. 5 representatively shows an exploded three-dimensional schematic view of the bracket 200, and FIG. 6 representatively shows an enlarged schematic view of the part A in FIG. 5. The structure, the connection manner, and the functional relationship of each main component of the battery device provided by the disclosure will be described in detail below with reference to the above drawings.

As shown in FIG. 1 to FIG. 3, in an embodiment of the disclosure, a surface of each battery 100 (that is, casing surface of the battery 100) includes a top surface 101, a bottom surface 102, two first side surfaces 103, and two second side surfaces 104. The two first side surfaces 103 are perpendicular to the first direction X and are spaced apart in the first direction X. The two second side surfaces 104 are parallel to the first direction X and are spaced apart in the second direction Y. Each battery 100 has a flange structure 110 arranged along the top surface 101, the bottom surface 102, and the two second side surfaces 104. On this basis, the battery device provided by the disclosure further includes brackets 200. Specifically, each bracket 200 is in contact with the top surface 101, the bottom surface 102, and the two second side surfaces 104 of the battery 100, the height of the bracket 200 is greater than or equal to the height of the flange structure 110, and at least a part of the bracket 200 is located between the flange structures 110 of adjacent batteries 100. It should be noted that taking the flange disposed on the top surface 101 of the battery 100 and the bracket 200 as an example, the so-called height of the bracket 200 and height of the flange structure 110 refer to the height of the bracket 200 extending away from the top surface 101 and the height of the flange structure 110 extending away from the top surface 101, which may also be understood as the thickness. Through the above structural design, the disclosure can enable the battery 100 to be in contact with a related structure of the battery device via the bracket 200, which increases the contact area between the battery 100 and the related structure, and avoids stress concentration on the flange structure 110, such that the battery device can have preferable structural stability and reliability.

It should be noted that different from the embodiment shown in FIG. 2 and FIG. 3, in some embodiments, the bracket 200 may also be in contact with only a part of the top surface 101, the bottom surface 102, and the two second side surfaces 104 of the battery 100. For example, the bracket 200 may be in contact with only the bottom surface 102 of the battery 100, may be in contact with only the two second side surfaces 104 of the battery 100, or may be in contact with the bottom surface 102 and the two second side surfaces 104 of the battery 100 at the same time. In other words, in various possible embodiments in accordance with the design concept of the disclosure, the bracket 200 is in contact with at least one of the top surface 101, the bottom surface 102, and the two second side surfaces 104 of the battery 100. On this basis, at least a part of the bracket 200 is located between at least a part of the flange structures of two adjacent batteries 100. Furthermore, the flange structure 110 is not limited to the arrangement along the top surface 101, the bottom surface 102, and the two second side surfaces 104 shown in FIG. 2 and FIG. 3. The flange structure 110 may also be arranged only on one or more of the surfaces of the battery 100. In other words, in various possible embodiments in accordance with the design concept of the disclosure, the battery 100 may have the flange structure 110 arranged along at least one of the top surface 101, the bottom surface 102, and the two second side surfaces 104.

As shown in FIG. 3 to FIG. 5, in an embodiment of the disclosure, the bracket 200 may include two first parts 201 and two second parts 202. Specifically, the two first parts 201 are respectively in contact with the top surface 101 and the bottom surface 102 of the battery 100, and the two second parts 202 are respectively in contact with the two second side surfaces 104 of the battery 100. Through the above structural design, the disclosure adopts the structure of multiple parts for the bracket 200 and uses different parts of the bracket 200 to be in contact with multiple positions on the surface of the battery 100, which is beneficial to reduce assembly difficulty of the bracket 200 and the battery 100, and improve the assembly efficiency.

As shown in FIG. 4 to FIG. 6, based on the structural design that the bracket 200 includes the first parts 201 and the second parts 202, in an embodiment of the disclosure, each second part 202 of the bracket 200 may include a first subpart 2021 and two second sub-parts 2022 that are integrally formed. Specifically, the first sub-part 2021 is in contact with the second side surface 104 of the battery 100, the two second sub-parts 2022 are respectively in contact with the top surface 101 and the bottom surface 102 of the battery 100, and the two second sub-parts 2022 are respectively spliced and connected to the two first parts 201. In other words, one of the second sub-parts 2022 of each of the two second parts 202 and one of the first parts 201 are jointly disposed on the top surface 101 of the battery 100, and the other one of the second sub-parts 2022 of each of the two second parts 202 and the other one of the first parts 201 are jointly disposed on the bottom surface 102 of the battery 100. For example, the second part 202 may substantially have a "⊏"-shaped structure, and the first part 201 may substantially have a "—"-shaped structure. Through the above structural design, the disclosure can dispose a connection position of the first parts 201 and the second parts 202 in a region corresponding to the top surface 101 and the bottom surface 102 of the battery 100, so as to avoid the connection positions of the first parts 201 and the second parts 202 being located in corner parts of the battery 100, causing assembly difficulty.

Figure 7:
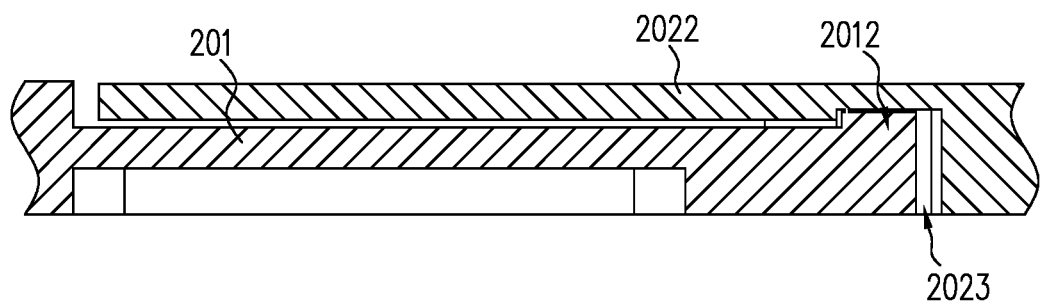
FIG. 7 is a partial cross-sectional view of a bracket of a battery device according to another exemplary embodiment.

Referring to FIG. 7, FIG. 7 representatively shows a partial cross-sectional view of the bracket 200 of a battery device according to another exemplary embodiment that can embody the principle of the disclosure.

As shown in FIG. 7, based on the structural design that the second parts 202 of the bracket 200 is connected to the first parts 201 via the second sub-parts 2022, in an embodiment of the disclosure, the junction of each second sub-part 2022 and a respective one of the first parts 201 may have a staggered lap structure. Through the above structural design, the disclosure can ensure the splicing strength of the second sub-parts 2022 and the first parts 201, and can further increase the splicing area between the structures on the premise of maintaining a smaller thickness, so as to avoid excessive occupation of the internal space of the battery device.

As shown in FIG. 7, based on the structural design of the staggered lap structure at the junction of the second sub-part 2022 and the first part 201, in an embodiment of the disclosure, the staggered lap portions of the second sub-part 2022 and the first part 201 may have an engaging structure including a buckle 2012 and a slot 2023. Specifically, the buckle 2012 may be disposed on the first part 201, the slot 2023 may be disposed on the second sub-part 2022, and the positions of the buckle 2012 and the slot 2023 may be interchanged. In some embodiments, the disclosure may also adopt other splicing structures to implement the splicing, such as a plug fitting structure including a plug and a socket, of the staggered lap portions of the second sub-part 2022 and the first part 201, which is not limited to the embodiment.

Figure 8:
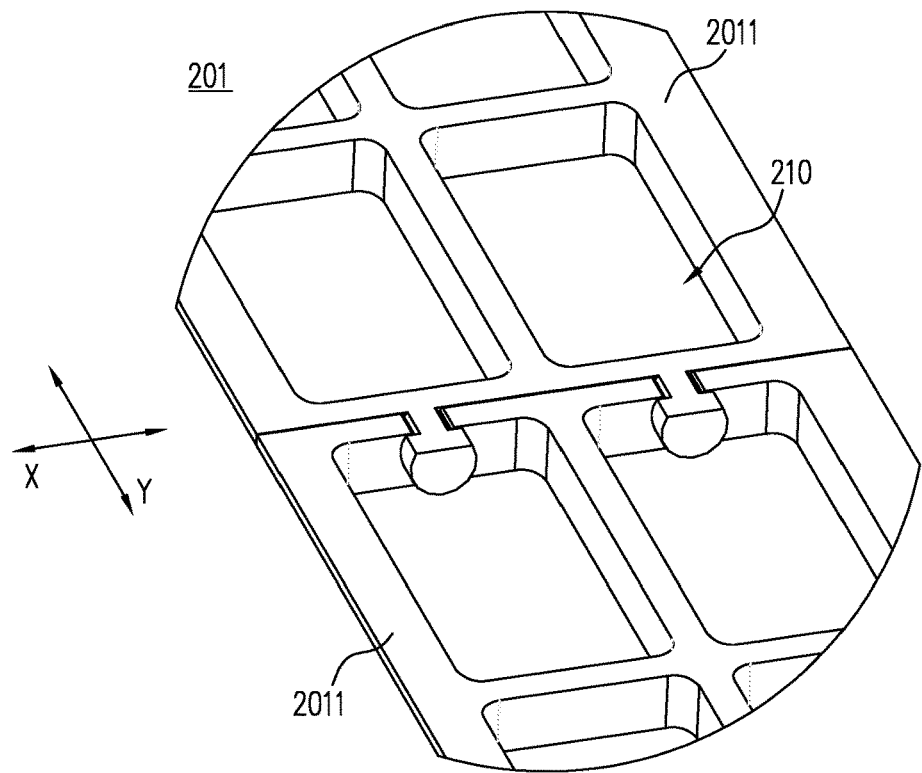
FIG. 8 is a partially enlarged schematic view of a first part of a bracket of a battery device according to another exemplary embodiment.

Referring to FIG. 8, FIG. 8 representatively shows a partially enlarged schematic view of the bracket 200 of a battery device according to another exemplary embodiment that can embody the principle of the disclosure.

As shown in FIG. 8, based on the structural design that the bracket 200 includes the first parts 201 and the second parts 202, in an embodiment of the disclosure, each first part 201 of the bracket 200 may include multiple third sub-parts 2011, and the third sub-parts 2011 are sequentially arranged in the second direction Y and are sequentially spliced and connected. Through the above structural design, since the length of the top surface 101 and the length of the bottom surface 102 of the battery 100 in the second direction Y are relatively longer, the length of each first part 201 of the bracket 200 is relatively longer, especially when the bracket 200 is used to be in contact with the surface of the battery 100, each first part 201 has a slender structure. In this regard, the disclosure can divide each first part 201 of the bracket 200 into multiple sections to avoid damage during processes such as transportation and storage.

Based on the structural design that each first part 201 of the bracket 200 includes the sequentially spliced third sub-parts 2011, in an embodiment of the disclosure, an engaging structure, a plug fitting structure, etc. may be adopted between adjacent third sub-parts 2011.

Based on the above, the embodiments shown in FIG. 1 to FIG. 8 are described by taking the bracket 200 including the two first parts 201 and the two second parts 202 as an example. In some embodiments, the bracket 200 may also include two parts, three parts, or more than five parts. Furthermore, the embodiments shown in FIG. 1 to FIG. 8 are described by taking one bracket 200 being in contact with the surface of one battery 100 as an example. In some embodiments, one bracket 200 may also be in contact with the surfaces of more than two batteries 100. For example, one bracket 200 may be in contact with the surfaces of all the batteries 100 of one battery pack. In other words, in various possible embodiments in accordance with the design concept of the disclosure, when one bracket 200 is in contact with the surface of one or more batteries 100, the bracket 200 may adopt the structural design that includes at least two parts, and the at least two parts are spliced and connected. In addition, when the bracket 200 includes the at least two parts that are spliced and connected, the junctions of different parts of the bracket 200 may further adopt the staggered lap structure.

Figure 11:
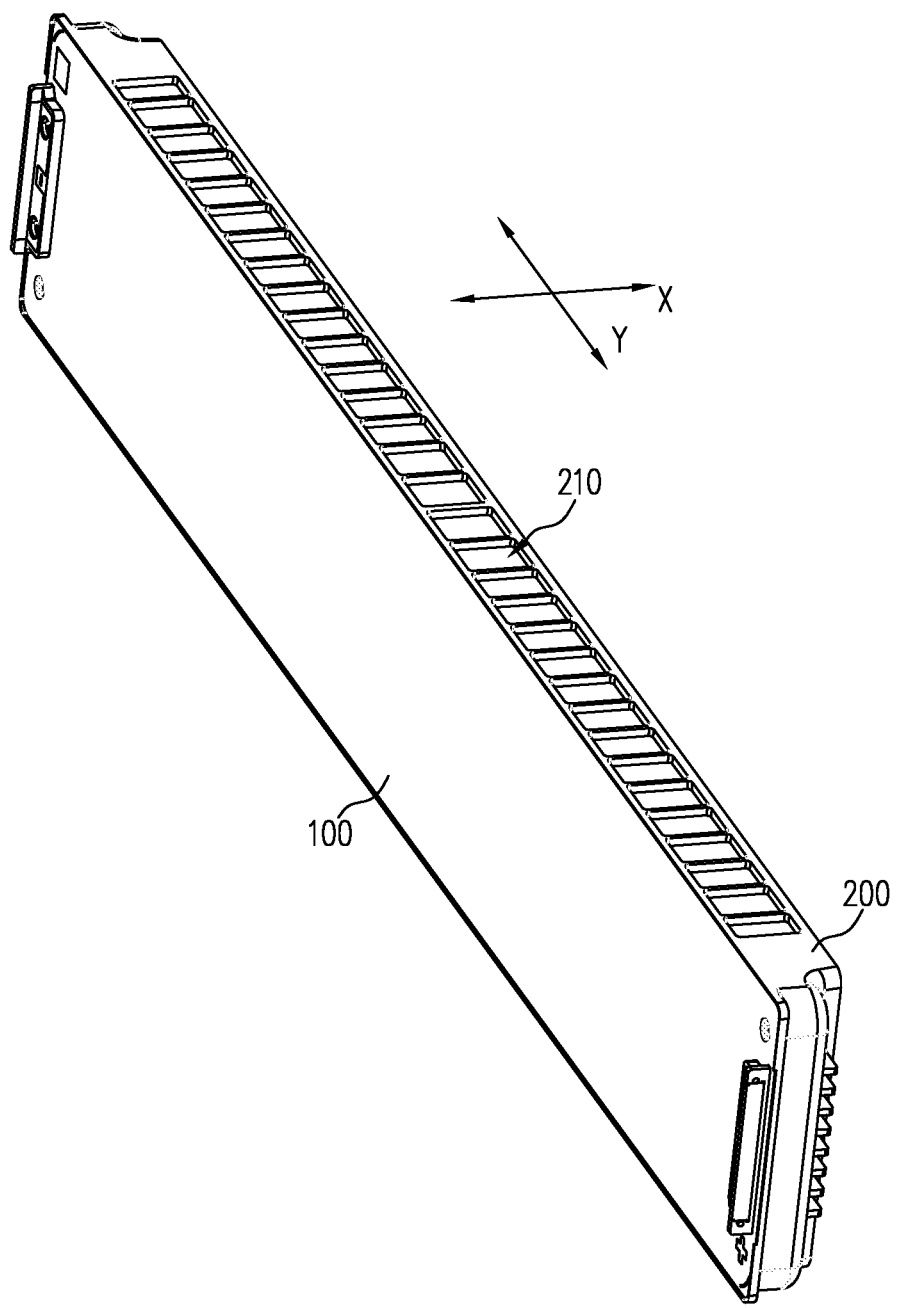
FIG. 11 is a three-dimensional structural schematic view of a partial structure of a battery device according to another exemplary embodiment.

Referring to FIG. 11, FIG. 11 representatively shows a three-dimensional structural schematic view of a partial structure of a battery device according to another exemplary embodiment that can embody the principle of the disclosure and specifically shows a three-dimensional structure of one battery 100 and one bracket 200.

As shown in FIG. 11, in an embodiment of the disclosure, the bracket 200 is in contact with the surface of the battery 100. On this basis, the bracket 200 may be an integral structure. Through the above structural design, the disclosure can reduce the number of parts and facilitate the assembly of the single battery 100 and the bracket 200.

Figure 12:
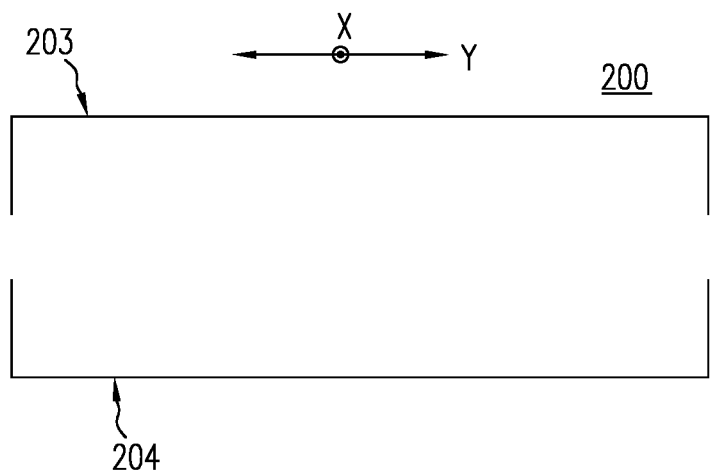
FIG. 12 to FIG. 15 are respectively plan schematic views of a bracket of a battery device according to other exemplary embodiments.

Referring to FIG. 12, FIG. 12 representatively shows a plan schematic view of the bracket 200 of a battery device according to another exemplary embodiment that can embody the principle of the disclosure and specifically shows a plane exploded structure of the bracket 200.

As shown in FIG. 12, in an embodiment of the disclosure, the bracket 200 adopts the structural design including two parts, and the two parts of the bracket 200 specifically include a third part 203 and a fourth part 204. Specifically, the third part 203 is in contact with the top surface 101 of the battery 100 and is in contact with a part of the two second side surfaces 104 of the battery 100 adjacent to the top surface 101 at the same time. The fourth part 204 is in contact with the bottom surface 102 of the battery 100 and is in contact with another part of the two second side surfaces 104 of the battery 100 adjacent to the bottom surface 102 at the same time. On this basis, the third part 203 substantially has a C-shaped structure (that is, a "⊓"-shaped structure), and the fourth part 204 substantially has a C-shaped structure (that is, a "⊔"-shaped structure). Through the above structural design, the disclosure can reduce the number of parts, which is beneficial to improve the assembly efficiency.

As shown in FIG. 12, based on the structural design that the bracket 200 includes the third part 203 and the fourth part 204, in an embodiment of the disclosure, the shape of the third part 203 and the shape of the fourth part 204 may be symmetrical. In other words, the shape of the third part 203 and the shape of the fourth part 204 are exactly the same, and the third part 203 and the fourth part 204 are symmetrically arranged with respect to a central plane of the battery 100, and the central plane may be a plane parallel to the first direction X and the second direction Y at the same time, and passes through the center of the battery 100. Through the above structural design, the disclosure can design the two parts of the bracket 200 to have exactly the same structure, so as to facilitate the processing and production of components of the two parts, and provide foolproof during the assembly process at the same time.

It should be noted that when the bracket 200 includes two parts, taking the third part 203 and the fourth part 204 as an example, the third part 203 and the fourth part 204 may also be respectively in contact with different surfaces of the battery 100, which is not limited to the embodiment shown in FIG. 12. In other words, in various possible embodiments in accordance with the design concept of the disclosure, when the bracket 200 includes the third part 203 and the fourth part 204, the third part 203 may be in contact with at least one of the top surface 101, the bottom surface 102, and the two second side surfaces 104 of the battery 100, and correspondingly, the fourth part 204 may be in contact with remaining parts of the top surface 101, the bottom surface 102, and the two second side surfaces 104 of the battery 100. Moreover, the third part 203 and the fourth part 204 shown in FIG. 12 are respectively disposed corresponding to an upper part and a lower part of the battery 100, that is, the third part 203 and the fourth part 204 are oppositely arranged. In some embodiments, the third part 203 and the fourth part 204 may also adopt other opposite arrangement forms, such as left and right opposite arrangement or oblique opposite arrangement. In addition, in the embodiment shown in FIG. 12, the bracket 200 including the third part 203 and the fourth part 204 is in contact with the surfaces of the batteries 100, so as to further reduce the number of parts and further improve the assembly efficiency. In some embodiments, when the bracket 200 includes the third part 203 and the fourth part 204, the bracket 200 may only contact the surface of one battery 100, which is not limited to the embodiment.

Based on the structural design that the bracket 200 includes the third part 203, and the third part 203 is in contact with the top surface 101 of the battery 100, in an embodiment of the disclosure, the battery device provided by the disclosure may further include an upper cover plate. The upper cover plate is located above the batteries 100. On this basis, the upper cover plate and the third part 203 may be an integral structure. Through the above structural design, the disclosure can reduce the number of parts, which is beneficial to improve the assembly efficiency, and can simplify the stacking difficulty to improve the assembly efficiency.

Based on the structural design that the bracket 200 includes the fourth part 204, and the fourth part 204 is in contact with the bottom surface 102 of the battery 100, in an embodiment of the disclosure, the battery device provided by the disclosure may further include a liquid cooling plate. The liquid cooling plate is located below the batteries 100. On this basis, the liquid cooling plate and the fourth part 204 may be an integral structure. Through the above structural design, the disclosure can reduce the number of parts, which is beneficial to improve the assembly efficiency, and can simplify the stacking difficulty to improve the assembly efficiency.

Figure 13:
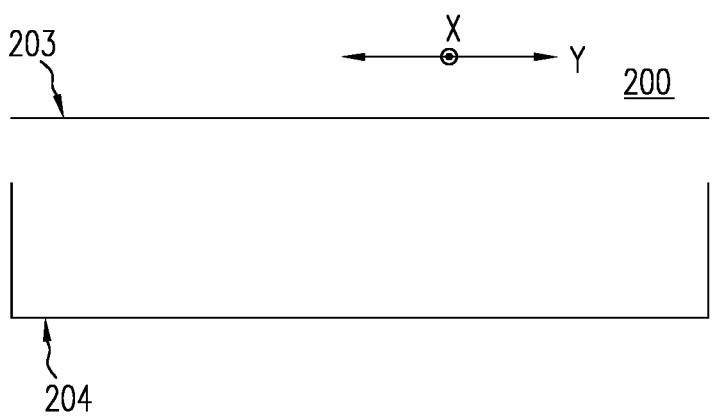

Referring to FIG. 13, FIG. 13 representatively shows a plan schematic view of the bracket 200 of a battery device according to another exemplary embodiment that can embody the principle of the disclosure and specifically shows a plane exploded structure of the bracket 200.

As shown in FIG. 13, in an embodiment of the disclosure, still taking the bracket 200 including the third part 203 and the fourth part 204 as an example, the third part 203 may be in contact with the top surface 101 of the battery 100, and the fourth part 204 may be in contact with all of the two second side surfaces 104 and the bottom surface 102 of the battery 100. On this basis, the third part 203 substantially has a "—"-shaped structure, and the fourth part 204 substantially has a C-shaped structure (that is, a "⊔"-shaped structure).

Figure 14:
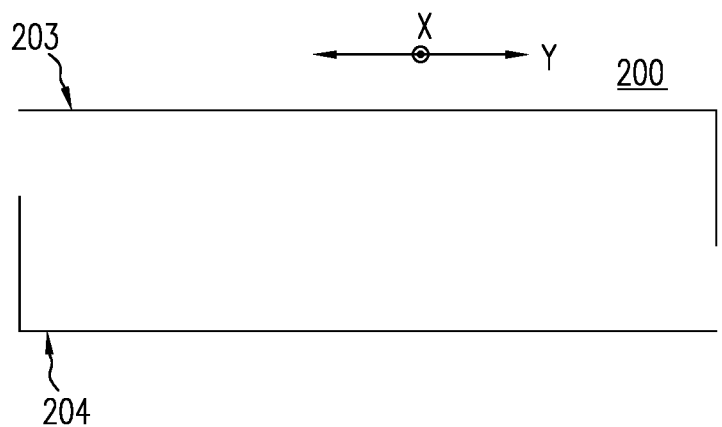

Referring to FIG. 14, FIG. 14 representatively shows a plan schematic view of the bracket 200 of a battery device according to another exemplary embodiment that can embody the principle of the disclosure and specifically shows a plane exploded structure of the bracket 200.

As shown in FIG. 14, in an embodiment of the disclosure, still taking the bracket 200 including the third part 203 and the fourth part 204 as an example, the third part 203 may be in contact with the top surface 101 and one of the second side surfaces 104 of the battery 100, and the fourth part 204 may be in contact with the bottom surface 102 and the other one of the second side surfaces 104 of the battery 100. On this basis, the third part 203 and the fourth part 204 respectively substantially have a "⌊" and "⌉"-shaped structure, that is, the third part 203 and the fourth part 204 are symmetrically arranged on a diagonal of the battery 100.

Figure 15:
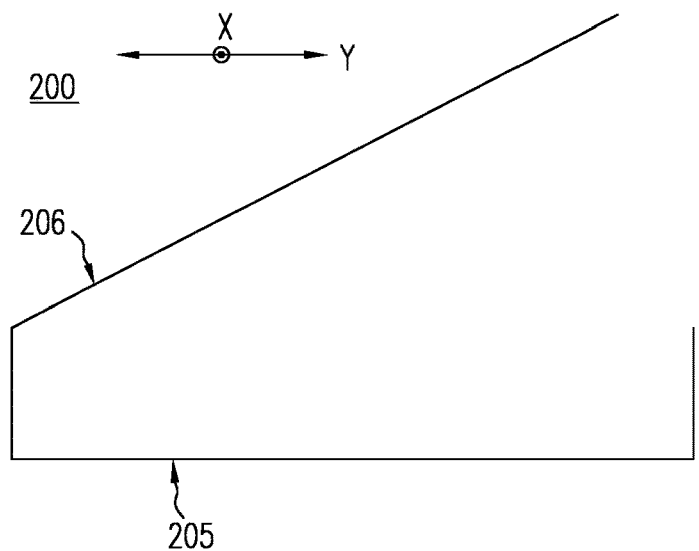

Referring to FIG. 15, FIG. 15 representatively shows a plan schematic view of the bracket 200 of a battery device according to another exemplary embodiment that can embody the principle of the disclosure and specifically shows a plan structure of the bracket 200 in an open state.

As shown in FIG. 15, in an embodiment of the disclosure, still taking the bracket 200 including two parts, such as a fifth part 205 and a sixth part 206, as an example, one end of the fifth part 205 may be pivotally connected to one end of the sixth part 206, so as to form the bracket 200 with a portal structure. Accordingly, the fifth part 205 and the sixth part 206 may be relatively pivoted to implement the opening and closing of the bracket 200. Through the above structural design, the disclosure is further beneficial to improve the assembly efficiency.

Based on the structural design of the pivot connection between the fifth part 205 and the sixth part 206, in an embodiment of the disclosure, the pivot connection between the fifth part 205 and the sixth part 206 may specifically select a combination structure of a rotating shaft and a hinge. Alternatively, the fifth part 205 and the sixth part 206 may be designed as an integral structure, and thinning (for example, a dent, etc.) may be disposed at the connection between the two to implement the relative pivotal connection between the two.

It should be noted that in the embodiment shown in FIG. 15, the fifth part 205 is in contact with the bottom surface 102 and the two second side surfaces 104 of the battery 100, and the sixth part 206 is in contact with the top surface 101 of the battery 100 as an example for illustration. In some embodiments, positions of the fifth part 205 and the sixth part 206 corresponding to the surface of the battery 100 may be flexibly selected. For example, the fifth part 205 may be preferably in contact with three of the top surface 101, the bottom surface 102, and the two second side surfaces 104 of the battery 100, and the sixth part 206 may be preferably in contact with the remaining one of the top surface 101, the bottom surface 102, and the two second side surfaces 104 of the battery 100.

Based on the structural design that the bracket 200 includes the pivotally connected fifth part 205 and sixth part 206. In an embodiment of the disclosure, the bracket 200 may include one fifth part 205 and multiple sixth parts 206. The fifth parts 205 is in contact with the surfaces of the batteries 100, and the sixth parts 206 are respectively in contact with the surface of at least one battery 100. For example, for the batteries 100 of one battery pack, the bracket 200 adopting the above structure may include the fifth part 205 and the sixth parts 206, and the number of the sixth parts 206 is less than the number of the batteries 100. Each sixth part 206 may be used to be in contact with the surface of at least one battery 100. Through the above structural design, the disclosure can implement the assembly and replacement of a single or part of the battery 100 without opening the entire bracket 200, which is beneficial to improve the assembly and maintenance efficiency.

Figure 16:
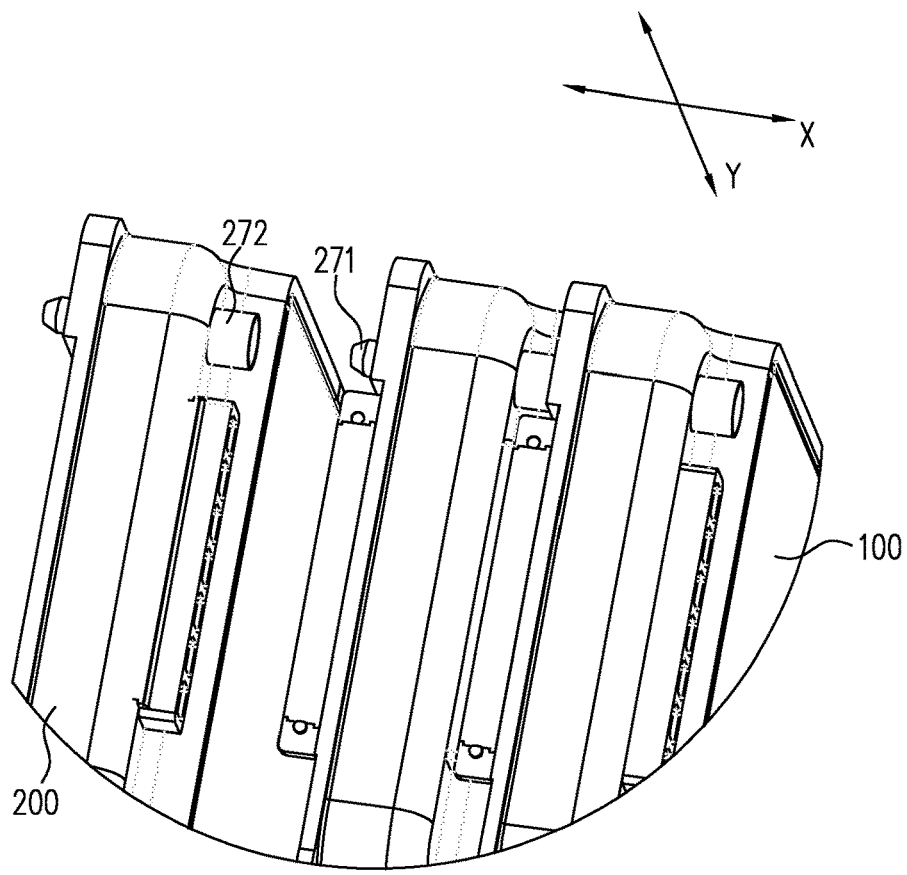
FIG. 16 and FIG. 17 are respectively three-dimensional structural schematic views of a partial structure of a battery device according to other exemplary embodiments.

Referring to FIG. 16, FIG. 16 representatively shows a three-dimensional structural schematic view of a partial structure of a battery device according to another exemplary embodiment that can embody the principle of the disclosure and specifically shows a three-dimensional structure of three batteries 100 and three brackets 200.

As shown in FIG. 16, in an embodiment of the disclosure, the battery device provided by the disclosure may include multiple brackets 200, and each bracket 200 is in contact with the surface of one battery 100. The brackets 200 are arranged in the first direction X and are detachably connected in sequence. Through the above structural design, the disclosure can respectively assemble the bracket 200 with the battery 100 before assembling into a whole battery pack, so that the bracket 200 can be provided before the battery is assembled into the battery device to avoid the additional assembly of the battery 100 and the bracket 200 during the assembly process of the battery device, which is further beneficial to improve the assembly efficiency of the battery device. At the same time, the disclosure sequentially connects the brackets 200 in a detachable manner, which can improve the stability and reliability of the whole structure formed by the brackets 200, can facilitate quick disassembly and assembly when a single or part of the bracket 200 and the battery 100 are individually replaced at the same time, and implements the modular design of the assembly structure of the battery 100 and the bracket 200.

As shown in FIG. 16, based on the structural design that multiple brackets 200 are sequentially connected in a detachable manner, in an embodiment of the disclosure, for any two adjacent brackets 200, taking a first bracket and a second bracket as an example, a fitting structure of a plug 271 and a socket 272 may be adopted. The plug 271 is disposed on a surface of the first bracket facing the second bracket. The socket 272 is disposed on a surface of the second bracket facing the first bracket and corresponds to the position of the plug 271. The socket 272 is provided with a jack for inserting the plug 271. In some embodiments, two adjacent brackets 200 may also adopt other plug-in structures to implement detachable connection, which is not limited to the embodiment.

Figure 17:
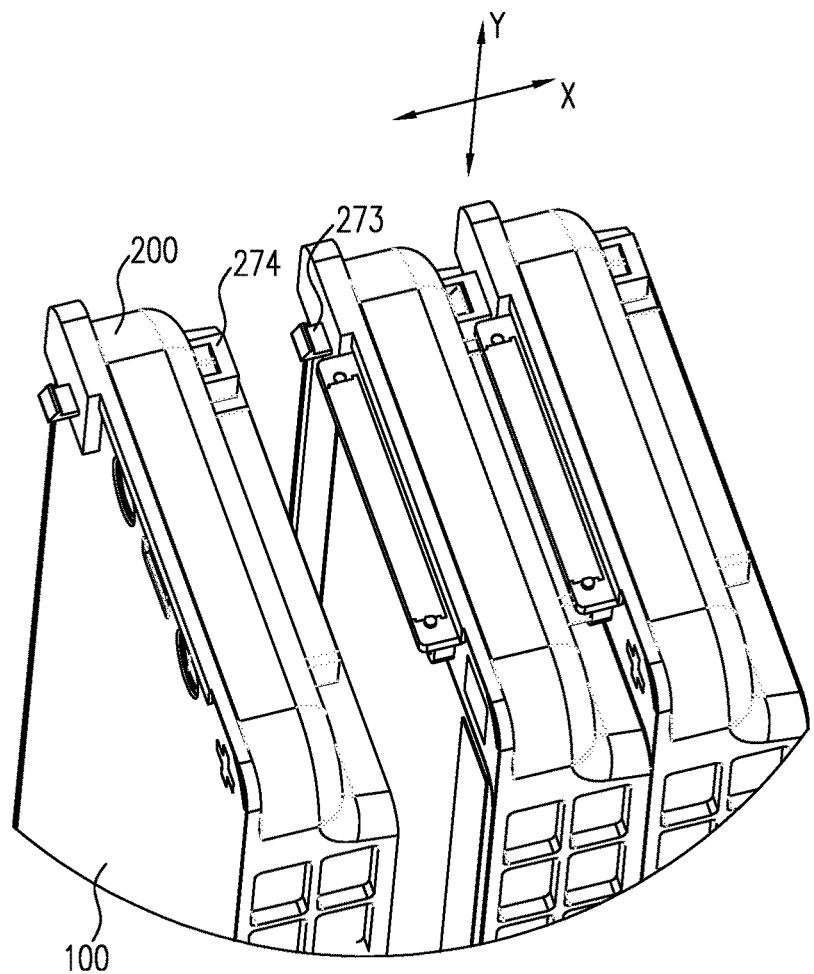

Referring to FIG. 17, FIG. 17 representatively shows a three-dimensional structural schematic view of a partial structure of a battery device according to another exemplary embodiment that can embody the principle of the disclosure and specifically shows a three-dimensional structure of three batteries 100 and three brackets 200.

As shown in FIG. 17, based on the structural design that multiple brackets 200 are sequentially connected in a detachable manner, in an embodiment of the disclosure, for any two adjacent brackets 200, taking the first bracket and the second bracket as an example, a fitting structure of a tenon 273 and a slot 274 may be adopted. The tenon 273 is disposed on the surface of the first bracket facing the second bracket. The slot 274 is disposed on the surface of the second bracket facing the first bracket and corresponds to the position of the tenon 273. The slot 274 is used for the tenon 273 to be snapped. In some embodiments, two adjacent brackets 200 may also adopt other snapping structures to implement detachable connection, which is not limited to the embodiment.

As shown in FIG. 3 to FIG. 5, in an embodiment of the disclosure, the bracket 200 may be provided with a hollow structure 210. The hollow structure 210 can expose a part of the surface of the battery 100. Through the above structural design, the disclosure can use the hollow structure 210 to reduce the weight of the bracket 200, which is beneficial to the lightweight design of the battery device, and the hollow structure 210 can be used to accommodate a structural adhesive at the same time, so that adhesive bonding between the battery 100 and the box of the battery device may be implemented via less structural adhesive in the hollow structure 210 to further improve the fixing strength of the battery 100 and the box.

As shown in FIG. 3, based on the structural design that the bracket 200 is provided with the hollow structure 210, in an embodiment of the disclosure, the hollow structure 210 may be disposed on a part of the bracket 200 in contact with the top surface 101 of the battery 100, such as being disposed on one first part 201 of the bracket 200 located above the battery 100, so as to expose a part of the top surface 101 of the battery 100. On this basis, the battery device provided by the disclosure further includes an upper cover plate (not shown in the drawing). The upper cover plate is located on a top part of the brackets 200, and the upper cover plate may be adhesively bonded to the batteries 100. Through the above structural design, the structural adhesive for bonding the upper cover plate and the top surface 101 of the battery 100 may be accommodated in the hollow structure 210 of the bracket 200, so as to improve the fixing strength of the battery 100 and the upper cover plate. In some embodiments, the top surface 101 of the battery may also be made of an insulating film or directly without adhesive coating, and the bracket 200 may not be provided with the hollow structure 210 but only in the structural form of a bracket. In order to facilitate the group installation of the batteries, the brackets 200 of the batteries 100 may be symmetrically arranged up and down.

Based on the structural design that the hollow structure 210 is disposed on the part of the bracket 200 in contact with the top surface 101 of the battery 100, in some embodiments, the battery device provided by the disclosure further includes a reinforcing plate. The reinforcing plate is located on the top part of the brackets 200, and the reinforcing plate may be adhesively bonded to the battery 100. Through the above structural design, the structural adhesive for bonding the reinforcing plate and the top surface 101 of the battery 100 may be accommodated in the hollow structure 210 of the bracket 200, so as to improve the fixing strength of the battery 100 and the reinforcing plate.

Based on the structural design that the hollow structure 210 is disposed on the part of the bracket 200 in contact with the top surface 101 of the battery 100, in some embodiments, the battery device provided by the disclosure further includes an upper cover plate and a reinforcing plate that are integrally formed. The upper cover plate and the reinforcing plate are located on the top part of the brackets 200, and the upper cover plate and the reinforcing plate may be adhesively bonded to the batteries 100. Through the above structural design, the structural adhesive for bonding the upper cover and the reinforcing plate to the top surface 101 of the battery 100 may be accommodated in the hollow structure 210 of the bracket 200, so as to improve the fixing strength of the battery 100 and the upper cover and the reinforcing plate.

As shown in FIG. 3, based on the structural design that each bracket 200 is provided with the hollow structure 210, in an embodiment of the disclosure, the hollow structure 210 may be disposed on a part of the bracket 200 in contact with the bottom surface 102 of the battery 100, such as being disposed on one first part 201 of the bracket 200 located below the battery 100, so as to expose a part of the bottom surface 102 of the battery 100. On this basis, the battery device provided by the disclosure further includes a liquid cooling plate (not shown in the drawing). The liquid cooling plate is located on a bottom part of the bracket 200, and the liquid cooling plate may be adhesively bonded to the battery 100. Through the above structural design, the structural adhesive for bonding the liquid cooling plate and the bottom surface 102 of the battery 100 may be accommodated in the hollow structure 210 of the bracket 200, so as to improve the fixing strength of the battery 100 and the liquid cooling plate.

Based on the structural design that the hollow structure 210 is disposed on the part of the bracket 200 in contact with the bottom surface 102 of the battery 100, in some embodiments, the battery device provided by the disclosure further includes a bottom plate. The bottom plate is located on the bottom part of the bracket 200, and the bottom plate may be adhesively bonded to the battery 100. Through the above structural design, the structural adhesive for bonding the bottom plate and the bottom surface 102 of the battery 100 may be accommodated in the hollow structure 210 of the bracket 200, so as to improve the fixing strength of the battery 100 and the bottom plate. In some embodiments, the bottom surface 102 of the battery may also be made of an insulating film or directly without adhesive coating, and the bracket 200 may not be provided with the hollow structure 210 but only in the structural form of a bracket. In order to facilitate the group installation of the batteries, the brackets 200 of the batteries 100 may be symmetrically arranged up and down.

Figure 9:
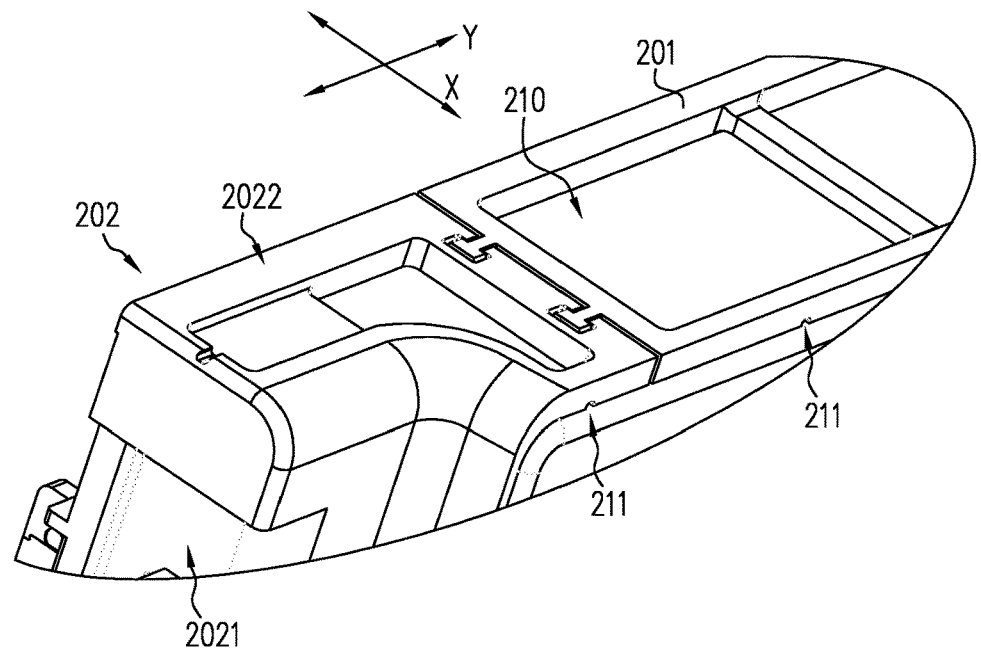
FIG. 9 is a partially enlarged schematic view of a partial structure of a battery device according to another exemplary embodiment.

Referring to FIG. 9, FIG. 9 representatively shows a partially enlarged schematic view of a partial structure of a battery device according to another exemplary embodiment that can embody the principle of the disclosure.

As shown in FIG. 9, based on the structural design that the bracket 200 is provided with the hollow structure 210, in an embodiment of the disclosure, a surface on one side of the bracket 200 facing the battery 100 may be provided with a through groove 211. The through groove 211 communicates the hollow structure 210 with the outside. In addition, as shown in FIG. 9, based on the structural design that the bracket 200 is provided with the hollow structure 210, in an embodiment of the disclosure, a surface on one side of the bracket 200 facing away from the battery 100 may be provided with the through groove 211. The through groove 211 communicates the hollow structure 210 with the outside.

Figure 10:
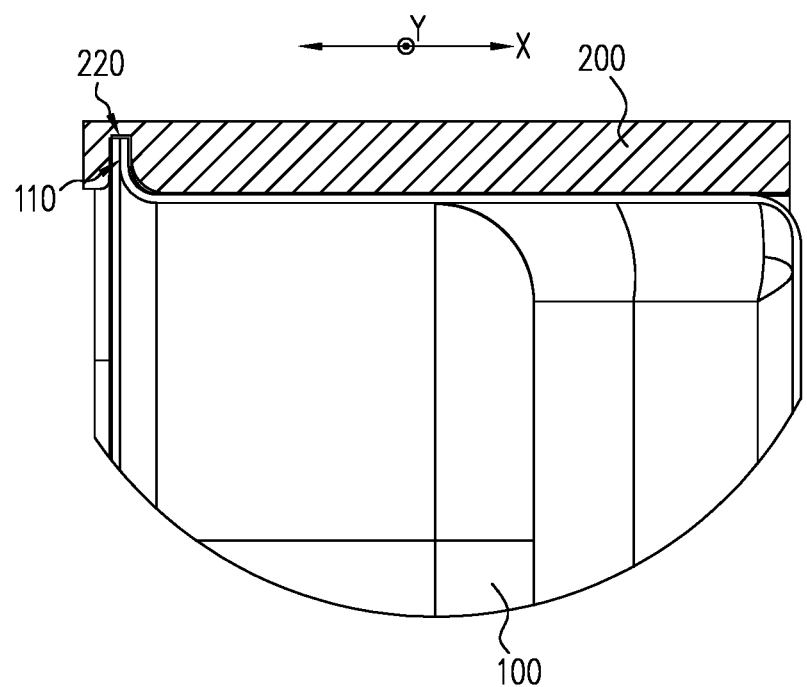
FIG. 10 is a partial cross-sectional view of a partial structure of a battery device according to another exemplary embodiment.

Through the above structural design, at least a part of the structural adhesive between the battery 100 and the box is accommodated in the hollow structure 210. When the battery 100 assembled with the bracket 200 is put into the case, extrusion during the casing process discharges gas in the hollow structure 210 via the through groove 211, which facilitates the flow of the adhesive, avoids the presence of gas in the hollow structure 210 that occupies the arrangement space of the structural adhesive, and ensures that the entire region of the hollow structure 210 is filled with the structural adhesive, thereby ensuring that the battery 100 and the box are more fully adhesively bonded, while improving the heat conduction area and the heat conduction efficiency between the battery 100 and structures such as the liquid cooling plate. Referring to FIG. 10, FIG. 10 representatively shows a partial cross-sectional view of a partial structure of a battery device according to another exemplary embodiment that can embody the principle of the disclosure.

As shown in FIG. 10, in an embodiment of the disclosure, the bracket 200 may be provided with an accommodating structure. The accommodating structure can accommodate the flange structure 110 of the battery 100. Through the above structural design, the disclosure can use the bracket 200 to provide protection to the flange structure 110. At the same time, when the bracket 200 is made of an insulating material, the disclosure can also use the bracket 200 to implement insulation protection for the flange structure 110.

As shown in FIG. 10, based on the structural design that the bracket 200 is provided with the accommodating structure for accommodating the flange structure 110, in an embodiment of the disclosure, the accommodating structure may be an accommodating groove 220. The surface on one side of the bracket 200 facing the battery 100 is provided with the accommodating groove 220. Through the above structural design, the disclosure can protect the flange structure 110 in three directions. The three directions may be understood as two sides of the flange in the first direction X and an outer side away from the battery 100 in the second direction Y.

As shown in FIG. 10, based on the structural design that the bracket 200 is provided with the accommodating groove 220 for accommodating the flange structure 110, in an embodiment of the disclosure, two sides of a notch of the accommodating groove 220 in the first direction X may be respectively provided with a chamfered structure. Through the above structural design, the disclosure can facilitate assembly more.

As shown in FIG. 10, based on the structural design that the bracket 200 is provided with the accommodating groove 220 for accommodating the flange structure 110, in an embodiment of the disclosure, the flange structure 110 is located on the first side surface 103 of the battery 100. A groove wall on one side of the accommodating groove 220 is located on one side of the flange structure 110 facing adjacent battery 100 and is not located between two adjacent batteries 100. Through the above structural design, the disclosure can further simplify the difficulty of stacking batteries into groups to improve the grouping efficiency. In some embodiments, when the flange structure 110 is located on the first side surface 103 of the battery 100, the groove wall on one side of the accommodating groove 220 may also be partially located between two adjacent batteries 100, and a lower end of the groove wall on one side is lower than the height of the cell of the battery 100. A height difference between the two may be, for example, but not limited to, 1 mm to 3 mm.

Figure 18:
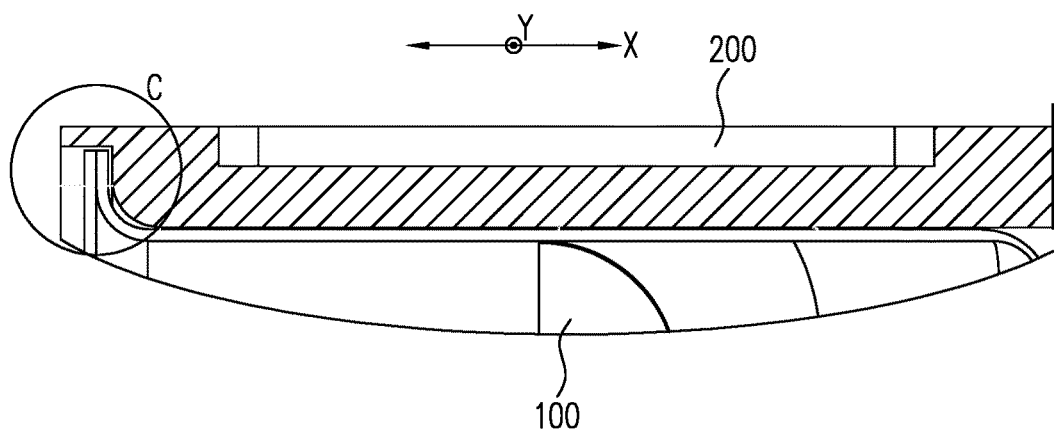
FIG. 18 is a partial cross-sectional view of a partial structure of a battery device according to another exemplary embodiment.
Figure 19:
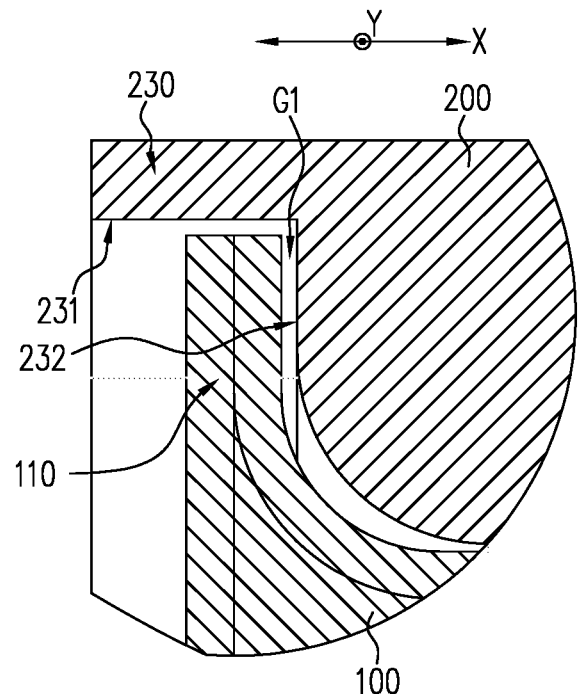
FIG. 19 is an enlarged schematic view of the part C in FIG. 18.

Referring to FIG. 18 and FIG. 19, FIG. 18 representatively shows a partial cross-sectional view of a partial structure of a battery device that can embody the principle of the disclosure, and reference may be made to the sectional position of FIG. 10 in FIG. 1 for the specific sectional position thereof. FIG. 19 representatively shows an enlarged schematic view of the part C in FIG. 19.

As shown in FIG. 18, in an embodiment of the disclosure, the battery device provided by the disclosure includes multiple brackets 200, and each bracket 200 is in contact with the surface of one battery 100. The brackets 200 are arranged in the first direction X. On this basis, an edge of the bracket 200 corresponding to the flange structure 110 may be provided with a stepped structure 230. The stepped structure 230 forms a space for accommodating the flange structure 110, that is, similar to the accommodating structure in the embodiment shown in FIG. 10. Through the above structural design, since the stepped structure 230 is disposed on the edge of the bracket 200, the processing is easier and the installation is facilitated.

As shown in FIG. 19, based on the structural design that the bracket 200 is provided with the stepped structure 230, in an embodiment of the disclosure, the flange structure 110 of the battery 100 may abut against a first stepped surface 231 of the stepped structure 230. The first stepped surface 231 is a surface of the stepped structure 230 parallel to the first direction X. Through the above structural design, the disclosure can implement the support of the flange structure 110 and the first stepped surface 231, which is beneficial to improve the supporting effect between the top surface 101 and the bottom surface 102 of the battery 100 and the bracket 200.

As shown in FIG. 19, based on the structural design that the bracket 200 is provided with the stepped structure 230, in an embodiment of the disclosure, in the first direction X, the stepped structure 230 may protrude from the flange structure 110. Through the above structural design, the disclosure can further optimize the protection effect of the stepped structure 230 on the flange structure 110.

As shown in FIG. 19, based on the structural design that the bracket 200 is provided with the stepped structure 230, in an embodiment of the disclosure, in the first direction X, the stepped structure 230 may protrude from the first side surface 103 of the battery 100. Through the above structural design, the disclosure can use the stepped structure 230 to provide a limiting function between adjacent batteries 100 and adjacent brackets 200, while facilitating the assembly of multiple batteries 100 and multiple brackets 200. In some embodiments, the stepped structure 230 may also be flush with the first side surface 103 of the battery 100, which is not limited to the embodiment.

As shown in FIG. 19, based on the structural design that the bracket 200 is provided with the stepped structure 230, in an embodiment of the disclosure, in the first direction X, the stepped structure 230 is perpendicular to a second stepped surface 232 in the first direction X, and there may be a gap G1 with the flange structure 110. Through the above structural design, the disclosure can provide a compression space for overpressure during assembly, avoid direct contact between the second stepped surface 232 and the flange structure 110 that causes damage during overpressure, and is beneficial to improve the assembly efficiency.

Based on the structural design of the gap G1 between the second stepped surface 232 and the flange structure 110, in an embodiment of the disclosure, the gap G1 between the second stepped surface 232 and the flange structure 110 may be 2 mm to 0.5 mm, such as 0.2 mm, 0.3 mm, 0.4 mm, and 0.5 mm. In some embodiments, the gap G1 between the second stepped surface 232 and the flange structure 110 may also be less than 0.2 mm or may be greater than 0.5 mm, such as 0.1 mm and 0.6 mm, which is not limited to the embodiment.

In an embodiment of the disclosure, when the battery device provided by the disclosure includes multiple brackets 200 arranged in the first direction X, and each bracket 200 is in contact with the surface of at least one battery 100, in the first direction X, there may be a gap between two adjacent brackets 200. Through the above structural design, the disclosure can provide a compression space for overpressure during assembly, avoid direct contact between adjacent brackets 200 that causes damage during overpressure, and is beneficial to improve the assembly efficiency at the same time.

Based on the structural design that there is the gap between two adjacent brackets 200, in an embodiment of the disclosure, the gap between two adjacent brackets 200 may be 0.2 mm to 0.5 mm, such as 0.2 mm, 0.3 mm, 0.4 mm, and 0.5 mm. In some embodiments, the gap between two adjacent brackets 200 may also be less than 0.2 mm or may be greater than 0.5 mm, such as 0.1 mm and 0.6 mm, which is not limited to the embodiment.

In an embodiment of the disclosure, when the battery device provided by the disclosure includes multiple brackets 200 arranged in the first direction X, and each bracket 200 is in contact with the surface of at least one battery 100, in the first direction X, two adjacent brackets 200 may be closely attached. Through the above structural design, the disclosure can use the close attachment of two adjacent brackets 200 to implement a limiting function of the brackets 200 in the first direction X.

Figure 20:
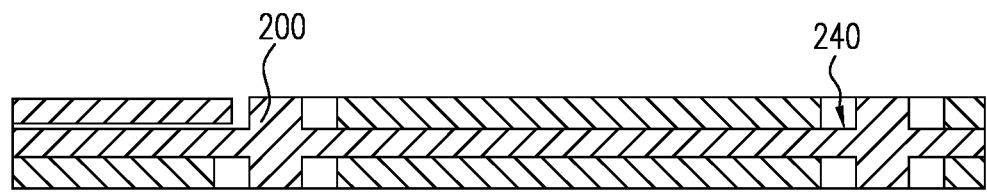
FIG. 20 is a cross-sectional view of a bracket of a battery device according to another exemplary embodiment.

Referring to FIG. 20, FIG. 20 representatively shows a cross-sectional view of the bracket 200 of a battery device according to another exemplary embodiment that can embody the principle of the disclosure.

As shown in FIG. 20, in an embodiment of the disclosure, the part of the bracket 200 in contact with the top surface 101 of the battery 100 (for example, the first part 201 of the bracket 200 located on a top part of the battery 100 shown in FIG. 4) may be provided with an adhesive accommodating structure. A thermally conductive structural adhesive is disposed in the adhesive accommodating structure. Through the above structural design, the disclosure can use the thermally conductive structural adhesive to reinforce the fixing strength of the battery 100, the bracket 200, and the box, and can use the thermally conductive structural adhesive to further optimize the insulating effect of the battery 100. In addition, in some embodiments, the adhesive accommodating structure may also be disposed on the part of the bracket 200 in contact with the bottom surface 102 of the battery 100 (for example, the first part 201 of the bracket 200 located on a bottom part of the battery 100 shown in FIG. 4).

As shown in FIG. 20, based on the structural design that the bracket 200 is provided with the adhesive accommodating structure, in an embodiment of the disclosure, the adhesive accommodating structure may include an adhesive accommodating groove 240. In some embodiments, the adhesive accommodating structure may also include other structures that can accommodate the thermally conductive structural adhesive, such as an adhesive accommodating hole, which is not limited to the embodiment.

As shown in FIG. 20, taking the adhesive accommodating structure including the adhesive accommodating groove 240 as an example, in an embodiment of the disclosure, the surfaces of the bracket 200 facing and facing away from the battery 100 may be respectively provided with the adhesive accommodating groove 240. Through the above structural design, the disclosure can use the adhesive accommodating grooves 240 on surfaces on two sides of the bracket 200 to respectively accommodate two layers of the thermally conductive structural adhesives, so as to respectively improve the fixing strength of the bracket 200 and the battery 100, the bracket 200, and the box. On this basis, the bracket 200 may be made of an insulating material, so as to implement a three-layer structure of thermally conductive structural adhesive-insulating layer-thermally conductive structural adhesive, while taking into account both the fixing effect and the insulating effect. In addition, the design that the adhesive accommodating grooves 240 are respectively disposed on the surfaces on two sides of the bracket 200 can reduce the amount of thermally conductive structural adhesive used, which is beneficial to reduce costs.

As shown in FIG. 20, based on the structural design that the surfaces of the bracket 200 facing and facing away from the battery 100 are respectively provided with the adhesive accommodating groove 240, in an embodiment of the disclosure, at least one adhesive accommodating groove 240 disposed on the surface of the bracket 200 facing the battery 100 has the same shape and corresponding position as at least one adhesive accommodating groove 240 disposed on the surface of the bracket 200 facing away from the battery 100, so that a cross-section of a part of the bracket 200 provided with the two adhesive accommodating grooves 240 is substantially "H"-shaped. Through the above structural design, the disclosure can enable the upper and lower layers of thermally conductive adhesive structures to be oppositely arranged, so as to improve the fixing strength, while further optimizing the structural rationality of the bracket 200 to implement the structural form in which the groove walls of the upper and lower adhesive accommodating grooves 240 are correspondingly arranged, so as to strengthen the supporting strength.

Figure 21:
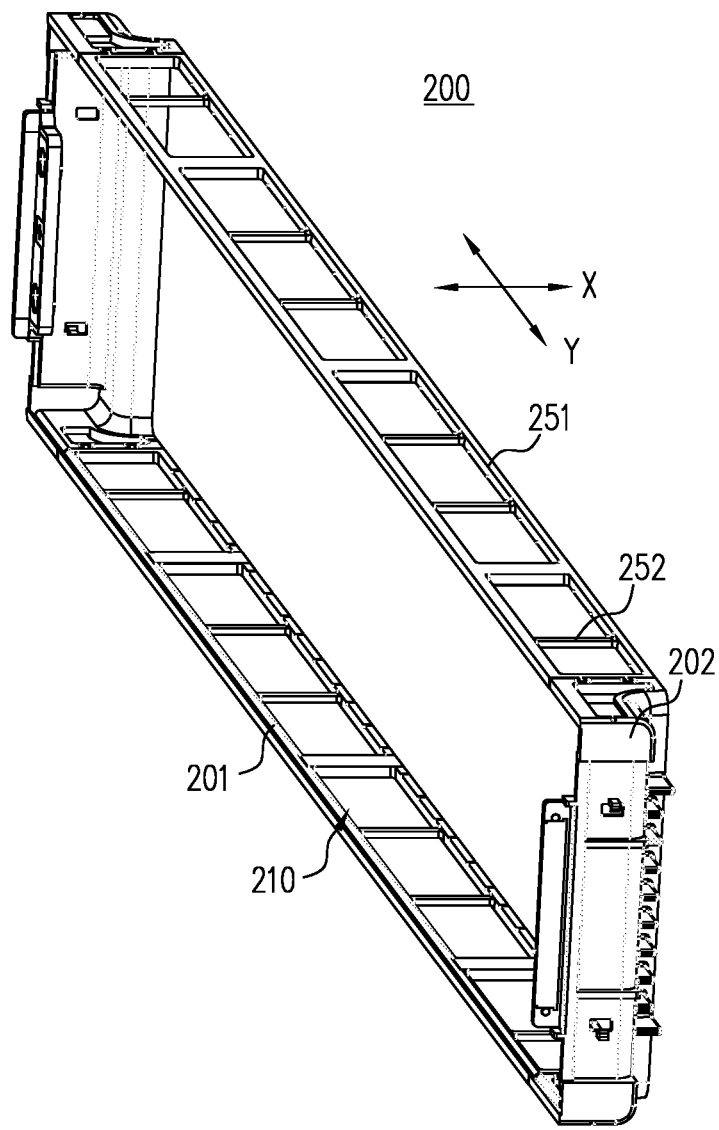
FIG. 21 is an enlarged schematic view of a partial structure of a bracket of a battery device according to another exemplary embodiment.
Figure 22:
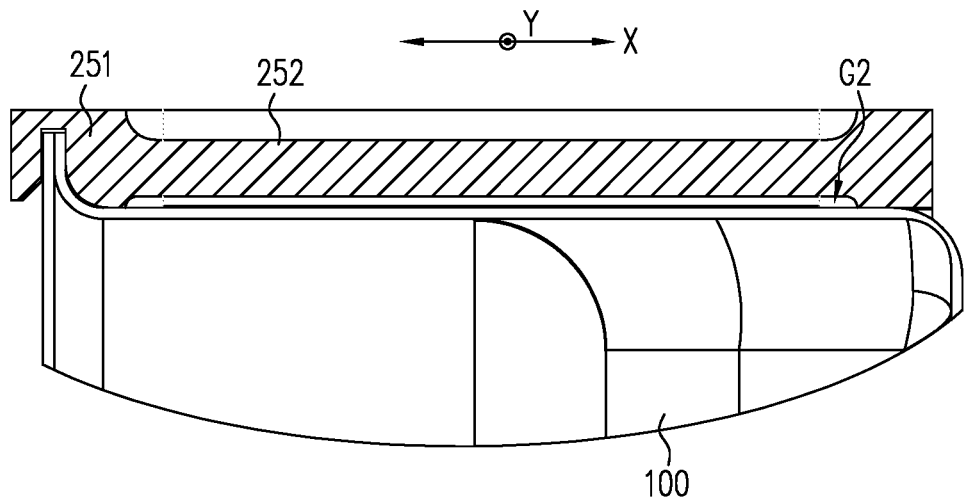
FIG. 22 is a partial cross-sectional view of an assembly structure of a bracket and a battery shown in FIG. 21.

Referring to FIG. 21 and FIG. 22, FIG. 21 representatively shows an enlarged schematic view of a partial structure of the bracket 200 of a battery device according to another exemplary embodiment that can embody the principle of the disclosure. FIG. 22 representatively shows a partial cross-sectional view of an assembly structure of the bracket 200 and the battery 100 shown in FIG. 21.

As shown in FIG. 21, in an embodiment of the disclosure, the part of the bracket 200 in contact with the top surface 101 of the battery 100 (for example, the first part 201 of the bracket 200 located on the top part of the battery 100 shown in FIG. 4) may include multiple rods 251. The rods 251 extend in the second direction Y, and the rods 251 are spaced apart in the first direction X. A reinforcing rib 252 extending in the first direction X may be connected between two adjacent rods 251. Through the above structural design, the disclosure can ensure the structural strength of the bracket 200 and further reduce the weight of the bracket 200 on this basis. In addition, in some embodiments, the part of the bracket 200 in contact with the bottom surface 102 of the battery 100 (for example, the first part 201 of the bracket 200 located on the bottom part of the battery 100 shown in FIG. 4) may also adopt the structural design of the rods 251 and the reinforcing ribs 252.

As shown in FIG. 22, based on the structural design that the bracket 200 includes the rods 251 and the reinforcing ribs 252, in an embodiment of the disclosure, the bracket 200 may be in contact with the surface of the battery 100 via the rods 251, and there may be a gap G2 between the reinforcing rib 252 and the surface of the battery 100. Through the above structural design, the disclosure can use the rods 251 of the bracket 200 to substantially correspond to edge positions of the battery 100. Since the size of the edge position of the battery 100 is more stable than sizes of middle regions and is not easy to swell, the supporting contact between the battery 100 and the bracket 200 is more stable, and may be used as an assembly reference for the battery 100 and the bracket 200 to ensure the accuracy of assembly. In addition, the gap G2 between the reinforcing rib 252 and the battery 100 can be compatible with a bulging phenomenon in a middle region of the surface of the battery 100 to ensure that the bracket 200 will not be lifted up, provide precision of grouping assembly positioning reference of the battery 100 and flatness of the bottom part and the top part of the battery 100 after assembly, and ensure the thickness and the area of the thermally conductive structural adhesive.

Based on the structural design that there is the gap G2 between the reinforcing rib 252 and the surface of the battery 100, in an embodiment of the disclosure, the gap G2 between the reinforcing rib 252 and the surface of the battery 100 may be 0.1 mm to 2 mm, such as 0.1 mm, 0.5 mm, 1 mm, and 2 mm. In some embodiments, the gap G2 between the reinforcing rib 252 and the surface of the battery 100 may also be less than 0.1 mm or may be greater than 2 mm, such as 0.09 mm and 2.1 mm, which is not limited to the embodiment.

As shown in FIG. 22, based on the structural design that the bracket 200 includes the rods 251 and the reinforcing ribs 252, in an embodiment of the disclosure, a surface on one side of the reinforcing rib 252 facing away from the battery 100 is closer to the battery 100 than a surface on one side of the rod 251 facing away from the battery 100. Accordingly, when the part of the bracket 200 in contact with the bottom surface 102 of the battery 100 adopts the structure including the rod 251 and the reinforcing rib 252, there can be a gap between the reinforcing rib 252 and a structure such as the bottom plate (or the liquid cooling plate) below the battery 100. When the part of the bracket 200 in contact with the top surface 101 of the battery 100 adopts the structure including the rods 251 and the reinforcing ribs 252, there can be a gap between the reinforcing rib 252 and a structure such as the upper cover plate (or the reinforcing plate) above the battery 100. Through the above structural design, the disclosure can be further beneficial to adhesive coating and adhesive melting, avoid swelling of the structure, and ensure flatness.

Based on the structural design that there is the gap between the reinforcing rib 252 and other structures on one side facing away from the battery 100, in an embodiment of the disclosure, the gap between the reinforcing rib 252 and other structures on one side facing away from the battery 100 may be 0.1 mm to 2 mm, such as 0.1 mm, 0.5 mm, 1 mm, and 2 mm. In some embodiments, the gap between the reinforcing rib 252 and other structures on one side facing away from the battery 100 may also be less than 0.1 mm or may be greater than 2 mm, such as 0.09 mm and 2.1 mm, which is not limited to the embodiment.

Based on the structural design that the bracket 200 includes the rods 251 and the reinforcing ribs 252, in an embodiment of the disclosure, one side of at least reinforcing rib 252 facing the battery 100 may be provided with an adhesive layer. The reinforcing rib 252 may be adhesively bonded to the battery 100 through the adhesive layer.

Based on the structural design that the reinforcing rib 252 is provided with the adhesive layer, in an embodiment of the disclosure, there may be multiple reinforcing ribs 252, and a part of the reinforcing ribs 252 may be provided with the adhesive layer. The width of the reinforcing rib 252 provided with the adhesive layer is greater than the width of the reinforcing rib 252 not provided with the adhesive layer. In addition, the adhesive layer may be, but not limited to, a double-sided adhesive. Through the above structural design, the disclosure can use the adhesive layer to implement the adhesive bonding between the reinforcing rib 252 and the battery 100, such as being applied to pre-fixation of the bracket 200 and the battery 100 in the early stage.

Figure 23:
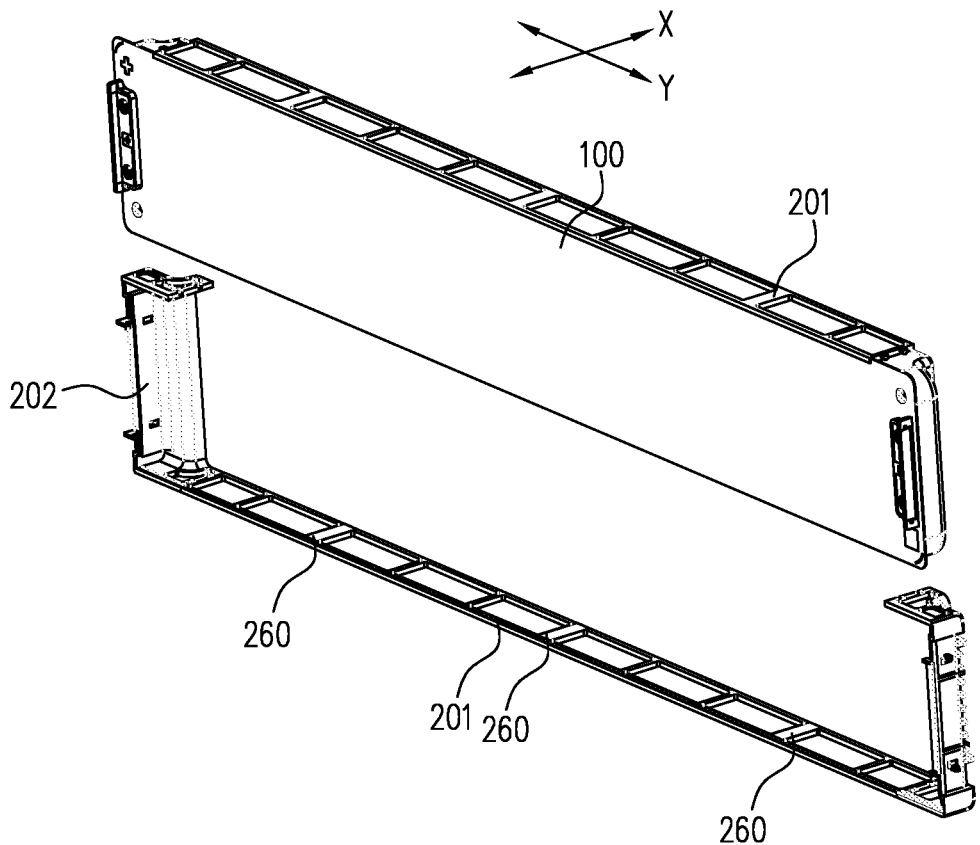
FIG. 23 is an exploded three-dimensional schematic view of a partial structure of a battery device according to another exemplary embodiment.

Referring to FIG. 23, FIG. 23 representatively shows an exploded three-dimensional schematic view of a partial structure of a battery device according to another exemplary embodiment that can embody the principle of the disclosure and specifically shows an exploded three-dimensional structure of the battery 100 and the bracket 200.

As shown in FIG. 23, in an embodiment of the disclosure, the part of the bracket 200 in contact with the bottom surface 102 of the battery 100 (for example, the first part 201 of the bracket 200 located on the bottom part of the battery 100 shown in FIG. 4) may be provided with an adhesive layer 260. Accordingly, the bracket 200 and the bottom surface 102 of the battery 100 are adhesively bonded via the adhesive layer 260. Through the above structural design, the disclosure can further reinforce the connection strength of the bracket 200 and the battery 100. In addition, in some embodiments, the part of the bracket 200 in contact with the top surface 101 of the battery 100 (for example, the first part 201 of the bracket 200 located on the top part of the battery 100 shown in FIG. 4) may also be provided with the adhesive layer 260 on a surface on one side thereof facing the battery 100.

As shown in FIG. 23, based on the structural design that the bracket 200 is provided with the adhesive layer 260, in an embodiment of the disclosure, taking the first part 201 including multiple third sub-parts 2011 shown in FIG. 4 as an example, when the first part 201 of the bracket 200 is provided with the adhesive layer 260, the adhesive layer 260 may be disposed at the connection between two adjacent third sub-parts 2011. Through the above structural design, the disclosure can reinforce the connection strength of two adjacent third sub-parts 2011 of the first part 201 while using the adhesive layer 260 to reinforce the connection strength of the bracket 200 and the battery 100.

In an embodiment of the disclosure, the part of the bracket 200 in contact with the bottom surface 102 of the battery 100 may be at the same level as the bottom surface 102. Through the above structural design, the disclosure facilitates installation, improves consistency of installation, improves assembly yield, and avoids adverse effects of the flange structure 110 on structures such as the liquid cooling plate below the battery 100.

In an embodiment of the disclosure, the material of the bracket 200 may be an insulating material. Through the above design, the disclosure can further optimize the insulating performance between the battery 100 and the box while improving the structural stability and reliability of the battery device.

In an embodiment of the disclosure, the surface of the battery 100 may be provided with an insulating layer. The insulating layer may at least partially overlap with the bracket 200.

In an embodiment of the disclosure, the bracket 200 is in contact with at least the bottom surface 102 of the battery 100. On this basis, an insulating layer may be disposed between adjacent first surfaces of adjacent batteries 100. The insulating layer may be, for example, but not limited to, an insulating film. Through the above structural design, the disclosure can further improve the whole insulation effect of the battery device. In some embodiments, when the bracket 200 is in contact with the top surface 101, the bottom surface 102, and the two second side surfaces 104 of the battery 100, the insulating layer may also be disposed between adjacent first surfaces of adjacent batteries 100.

In an embodiment of the disclosure, the battery device provided by the disclosure may further include a liquid cooling plate. The liquid cooling plate is located below the bracket 200.

As shown in FIG. 1 to FIG. 3, in an embodiment of the disclosure, the area of each first side surface 103 of the battery 100 may be greater than the area of each second side surface 104 thereof. In other words, the first side surface 103 of the battery 100 may be the "larger surface" thereof.

It should be noted that the battery device shown in the drawings and described in the specification is only a few examples of many types of battery devices that can adopt the principle of the disclosure. It should be clearly understood that the principle of the disclosure is in no way limited to any detail or any part of the battery device shown in the drawings or described in the specification.

In summary, the battery device provided by the disclosure includes the bracket 200, the bracket 200 is in contact with the surface of the battery 100, the height of the bracket 200 is greater than or equal to the height of the flange structure 110, and at least a part of the bracket 200 is located between the flange structures 110 of adjacent batteries 100. Through the above structural design, the disclosure can enable the battery 100 to be in contact with the related structure of the battery device via the bracket 200, which increases the contact area between the battery 100 and the related structure, and avoids stress concentration on the flange structure 110, so that the battery device can have preferable structural stability and reliability.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery device, comprising a plurality of batteries arranged in a first direction, wherein a surface of a casing of each battery includes a top surface, a bottom surface, two first side surfaces, and two second side surfaces, the two first side surfaces are perpendicular to the first direction and are spaced apart in the first direction, the two second side surfaces are parallel to the first direction and are spaced apart in a second direction, the second direction is perpendicular to the first direction, each battery has a flange structure arranged along at least one of the top surface, the bottom surface, and the two second side surfaces, and the flange structure extends from the casing and along a plane parallel to the two first side surfaces;
    the battery device further comprising brackets, each bracket is in contact with at least one of the top surface, the bottom surface, and the two second side surfaces of a respective one of the batteries, a height of each bracket is greater than or equal to a height of the flange structure, and at least a part of each bracket is located between at least a part of the flange structures of two adjacent batteries of the plurality of batteries,
    wherein each bracket is provided with a hollow structure for exposing a part of the surface of a respective one of the batteries,
    wherein the hollow structure is disposed on a part of each bracket in contact with the top surface of a respective one of the batteries to expose a part of the top surface of the respective one of the batteries,
    wherein:
        the battery device further comprises an upper cover plate, the upper cover plate is located on a top part of the brackets, and the upper cover plate is adhesively bonded to the batteries; or
        the battery device further comprises a reinforcing plate, the reinforcing plate is located on the top part of the brackets, and the reinforcing plate is adhesively bonded to the batteries; or
        the battery device further comprises an upper cover plate and a reinforcing plate that are integrally formed, the upper cover plate and the reinforcing plate are located on the top part of the brackets, and the upper cover plate and the reinforcing plate are adhesively bonded to the batteries,
    wherein each bracket is provided with an accommodating structure, and the accommodating structure is configured to accommodate the flange structure,
    wherein an area of each first side surface is greater than an area of each second side surface,
    wherein each bracket is in contact with the surface of one or more of the batteries, each bracket comprises at least two parts, and the at least two parts are spliced and connected,
    wherein the at least two parts of each bracket comprises two first parts and two second parts, the two first parts are respectively in contact with the top surface and the bottom surface of the battery, and the two second parts are respectively in contact with the two second side surfaces of the battery,
    wherein each second part comprises a first sub-part and two second sub-parts that are integrally formed, the first sub-part is in contact with one of the second side surfaces of the battery, the two second sub-parts are respectively in contact with the top surface and the bottom surface of the battery, and are respectively spliced and connected to the two first parts, and
    wherein a junction of each of the second sub-parts and a respective one of the first parts has a staggered lap structure.

2. The battery device according to claim 1, wherein each bracket is in contact with the surface of a respective one of the batteries, and the bracket is an integral structure.

3. The battery device according to claim 1, wherein each first part comprises a plurality of third sub-parts, and the third sub-parts are sequentially arranged in the second direction and are sequentially spliced and connected.

4. The battery device according to claim 1, wherein the at least two parts of each bracket comprise a third part and a fourth part, the third part is in contact with at least one of the top surface, the bottom surface, and the two second side surfaces of the battery, and the fourth part is in contact with remaining parts of the top surface, the bottom surface, and the two second side surfaces of the battery.

5. The battery device according to claim 4, wherein the third part has a C-shaped structure, and the fourth part has a C-shaped structure.

6. The battery device according to claim 5, wherein a shape of the third part and a shape of the fourth part are symmetrical.

7. The battery device according to claim 5, wherein the third part and the fourth part are oppositely arranged up and down.

8. The battery device according to claim 7, wherein:
    the battery device further comprising an upper cover plate, the upper cover plate is located above the batteries, and the upper cover plate and the third part are an integral structure; and/or
    the battery device further comprising a liquid cooling plate, the liquid cooling plate is located below the batteries, and the liquid cooling plate and the fourth part are an integral structure.

9. The battery device according to claim 1, wherein junctions of different parts of each bracket have a staggered lap structure.

10. The battery device according to claim 9, wherein staggered lap portions of the different parts of each bracket have an engaging structure comprising a buckle and a slot.

11. The battery device according to claim 1, wherein each bracket comprises a fifth part and a sixth part, the fifth part is in contact with three of the top surface, the bottom surface, and the two second side surfaces of the battery, the sixth part is in contact with a remaining one of the top surface, the bottom surface, and the two second side surfaces of the battery, and the fifth part is pivotally connected to the sixth part, such that the sixth part forms a portal structure.

12. The battery device according to claim 11, wherein the sixth part is in plurality, the fifth part is in contact with the surfaces of the plurality of batteries, and the sixth parts are respectively in contact with the surface of at least one of the batteries.

13. The battery device according to claim 1, comprising a plurality of the brackets, wherein each of the brackets is in contact with the surface of at least one of the batteries, and the brackets are arranged in the first direction and are detachably connected in sequence.

14. The battery device according to claim 1, wherein the hollow structure is disposed on a part of each bracket in contact with the bottom surface of a respective one of the batteries to expose a part of the bottom surface of a respective one of the batteries, wherein:
    the battery device further comprising a bottom plate, the bottom plate is located on a bottom part of the brackets, and the bottom plate is adhesively bonded to the batteries; or
    the battery device further comprising a liquid cooling plate, the liquid cooling plate is located on a bottom part of the brackets, and the liquid cooling plate is adhesively bonded to the batteries.

15. The battery device according to claim 1, wherein:
    a surface on one side of each bracket facing a respective one of the batteries is provided with a through groove, and the through groove communicates with the hollow structure and an outside; and/or a surface on one side of each bracket away from a respective one of the batteries is provided with a through groove, and the through groove communicates with the hollow structure and the outside.

16. The battery device according to claim 1, wherein the accommodating structure is an accommodating groove, and the accommodating groove is disposed on a surface on one side of each bracket facing a respective one of the batteries.

17. The battery device according to claim 16, wherein two sides of a notch of the accommodating groove in the first direction are respectively provided with chamfered structures.

18. The battery device according to claim 16, wherein:
the flange structure is located on the first side surface, a groove wall on one side of the accommodating groove is located between adjacent two of the batteries, and a lower end of the groove wall is lower than a height of a cell of each battery; or
the flange structure is located on the first side surface, a groove wall on one side of the accommodating groove is located on one side of the flange structure facing an adjacent one of the batteries and is not located between adjacent two of the batteries.

19. The battery device according to claim 1, comprising a plurality of the brackets, wherein each of the brackets is in contact with the surface of a respective one of the batteries, the brackets are arranged in the first direction, wherein each bracket is provided with a stepped structure corresponding to an edge of the flange structure, and the stepped structure forms a space for accommodating the flange structure.

20. The battery device according to claim 19, wherein the flange structure abuts against a first stepped surface of the stepped structure parallel to the first direction.

21. The battery device according to claim 19, wherein in the first direction, the stepped structure protrudes from the flange structure toward an adjacent one of the brackets.

22. The battery device according to claim 19, wherein in the first direction, the stepped structure is flush with the first side surface, or the stepped structure protrudes from the first side surface of a respective one of the batteries toward an adjacent one of the brackets.

23. The battery device according to claim 19, wherein in the first direction, a second stepped surface of the stepped structure is perpendicular to the first direction, and a gap is defined between the second stepped surface and the flange structure.

24. The battery device according to claim 23, wherein the gap between the second stepped surface and the flange structure is 0.2 mm to 0.5 mm.

25. The battery device according to claim 1, comprising a plurality of the brackets, wherein each of the brackets is in contact with the surface of at least one of the batteries, the brackets are arranged in the first direction, wherein in the first direction, a gap is defined between adjacent two of the brackets.

26. The battery device according to claim 25, wherein the gap between the adjacent two of the brackets is 0.2 mm to 0.5 mm.

27. The battery device according to claim 1, comprising a plurality of the brackets, wherein each of the brackets is in contact with the surface of at least one of the batteries, the brackets are arranged in the first direction, wherein in the first direction, adjacent two of the brackets are attached.

28. The battery device according to claim 1, wherein a part of each bracket in contact with the top surface and/or the bottom surface of a respective one of the batteries is provided with an adhesive accommodating structure, and a thermally conductive structural adhesive is disposed in the adhesive accommodating structure.

29. The battery device according to claim 28, wherein the adhesive accommodating structure comprises an adhesive accommodating groove and/or an adhesive accommodating hole.

30. The battery device according to claim 29, wherein the adhesive accommodating groove is in plurality, and surfaces of each bracket facing and facing away from a respective one of the batteries are respectively provided with the adhesive accommodating grooves.

31. The battery device according to claim 1, wherein a part of each bracket in contact with the top surface and/or the bottom surface of a respective one of the batteries comprises a plurality of rods, each of the rods extend in the second direction, the rods are spaced apart in the first direction, and a reinforcing rib extending in the first direction is connected between adjacent two of the rods.

32. The battery device according to claim 31, wherein each bracket is in contact with the top surface and/or the bottom surface of a respective one of the batteries via the rods, and a gap is defined between the reinforcing rib and the surface of the respective one of the batteries.

33. The battery device according to claim 31, wherein a surface on one side of the reinforcing rib facing away from a respective one of the batteries is closer to the battery than a surface on one side of each rod facing away from the respective one of the batteries.

34. The battery device according to claim 31, wherein one side of at least one of the reinforcing rib facing a respective one of the batteries is provided with an adhesive layer, and the reinforcing rib and the respective one of the batteries are adhesively bonded through the adhesive layer.

35. The battery device according to claim 34, wherein the reinforcing rib is in plurality, wherein a part of the reinforcing ribs is provided with the adhesive layer, and a width of each of the reinforcing ribs provided with the adhesive layer is greater than a width of each of the reinforcing ribs not provided with the adhesive layer.

36. The battery device according to claim 1, wherein:
a part of each bracket in contact with the top surface of a respective one of the batteries is provided with an adhesive layer, such that each bracket and the top surface of the respective one of the batteries are adhesively bonded; and/or
a part of the bracket in contact with the bottom surface of a respective one of the batteries is provided with an adhesive layer, such that each bracket and the bottom surface of the respective one of the batteries are adhesively bonded.

37. The battery device according to claim 1, wherein a part of each bracket in contact with the bottom surface of a respective one of the batteries is at a same level as the bottom surface.

38. The battery device according to claim 1, wherein a material of each bracket is an insulating material.

39. The battery device according to claim 1, wherein the surface of each battery is provided with an insulating layer, and the insulating layer at least partially overlaps with a respective one of the brackets.

40. The battery device according to claim 1, wherein:
each bracket is in contact with the bottom surface of a respective one of the batteries, and an insulating layer is disposed between adjacent first surfaces of the adjacent batteries; or
each bracket is in contact with the top surface, the bottom surface, and the two second side surfaces of a respective one of the batteries, and an insulating layer is disposed between adjacent first surfaces of adjacent two of the batteries.

41. The battery device according to claim 1, further comprising a liquid cooling plate, wherein the liquid cooling plate is located below the brackets.

* * * * *